United States Patent
Bhardwaj et al.

(10) Patent No.: US 12,486,992 B2
(45) Date of Patent: Dec. 2, 2025

(54) SYSTEM AND METHOD FOR DETECTING A REFRIGERANT LEAK IN AN HVAC SYSTEM USING A SUBCOOLING TEMPERATURE

(71) Applicant: Lennox Industries Inc., Richardson, TX (US)

(72) Inventors: Vickey Bhardwaj, Kancheepuram (IN); Sangameshwaran Sadhasivam, Kanchipuram (IN); Patric Ananda Balan Thobias, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 147 days.

(21) Appl. No.: 18/411,662

(22) Filed: Jan. 12, 2024

(65) Prior Publication Data

US 2025/0230940 A1  Jul. 17, 2025

(51) Int. Cl.
*F24F 11/36* (2018.01)
*F24F 11/84* (2018.01)

(52) U.S. Cl.
CPC .............. *F24F 11/36* (2018.01); *F24F 11/84* (2018.01)

(58) Field of Classification Search
CPC .................................. F24F 11/36; F24F 11/84
See application file for complete search history.

(56) References Cited

U.S. PATENT DOCUMENTS 11,125,457 B1 * 9/2021 Alfano ...................... F24F 11/36

FOREIGN PATENT DOCUMENTS

WO    WO-2024202103 A1 * 10/2024 .............. F24F 11/36

OTHER PUBLICATIONS

Satoshi, Refrigerant leakage detection system, 2023, Full Document (Year: 2023).*
Sangameshwaran Sadhasivam et al., U.S. Appl. No. 18/411,585, entitled "System and Method for Detecting a Refrigerant Leak in an HVAC System Using a Saturated Suction Temperature," filed Jan. 12, 2024.

(Continued)

*Primary Examiner* — Nael N Babaa
(74) *Attorney, Agent, or Firm* — Baker Botts L.L.P.

(57) ABSTRACT

A method operating an HVAC system is provided. The method includes receiving a concentration of refrigerant. The method includes operating the HVAC system in a leak diagnostic mode if the concentration exceeds a gas concentration threshold. The method includes turning on a compressor to compress the refrigerant. The method includes receiving a first saturated liquid temperature and a first subcooled liquid temperature, and determining a first subcooled value based on the difference. The method includes turning off the compressor for a duration, and turning on the compressor after the duration has elapsed. The method includes receiving a second saturated liquid temperature and a second subcooled liquid temperature, and determining a second subcooled value based on the difference. The method includes determining that the first refrigerant circuit includes a refrigerant leak if the second subcooled value or the first subcooled value exceeds a subcooled threshold value.

20 Claims, 13 Drawing Sheets

(56) References Cited

OTHER PUBLICATIONS

Sangameshwaran Sadhasivam et al., U.S. Appl. No. 18/411,664, entitled, "System and Method for Detecting a Refrigerant Leak in an HVAC System Using a Superheat Temperature," filed Jan. 12, 2024.

Vickey Bhardwaj et al., U.S. Appl. No. 18/411,818, entitled, "System and Method for Detecting a Refrigerant Leak in an HVAC System Operating in an Idle Mode," filed Jan. 12, 2024.

Vickey Bhardwaj et al., U.S. Appl. No. 18/411,785, entitled, "System and Method for Evacuating a Refrigerant Leak in an HVAC System," filed Jan. 12, 2024.

\* cited by examiner

SYSTEM AND METHOD FOR DETECTING A REFRIGERANT LEAK IN AN HVAC SYSTEM USING A SUBCOOLING TEMPERATURE

TECHNICAL FIELD

This disclosure relates generally to heating, ventilation, and air conditioning (HVAC) systems. More particularly, this disclosure relates to a system and method for detecting a refrigerant leak in an HVAC system using a subcooling temperature.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY

Regulations in the HVAC industry are pushing manufacturers to transition away from traditional refrigerants towards low global warming potential (GWP) refrigerants, particularly mildly flammable (A2L) refrigerants and flammable (A3) refrigerants. Currently, there is a need to develop HVAC systems that are optimized for low GWP refrigerants. Notably, in the case of flammable refrigerants, such as A2L and A3 refrigerants, there is a need to develop mitigation systems and methods that can detect the presence of leaked refrigerant and implement strategies for mitigating the leak. HVAC systems using low GWP refrigerants should include a refrigerant detection system (RDS) that sounds an alarm when a leak detection sensor detects the presence of a refrigerant above a threshold concentration. In some instances, the threshold concentration is set to a low value to ensure that even low concentrations of refrigerant leaks are detected and mitigated. However, setting the threshold concentration to low values may result in frequent alarms that bother the users of the HVAC system. Additionally, during the prolonged mitigation, the refrigerant leak could seep into the conditioned environment.

This disclosure addresses the aforementioned problems by providing an HVAC system that can detect the presence of a refrigerant leak and can reduce the number of alarms that are triggered in the HVAC system in response to the detected leak and also isolate the leaked refrigerant from the conditioned environment. The provided HVAC system and method may identify a refrigerant leak caused by one or more circuit in the HVAC system and initiate various modes of operation to mitigate the leaked refrigerant and/or evacuate the leaked refrigerant from the circuit identified as causing the leak. In one embodiment, the provided HVAC system and method may determine which circuit is leaking the refrigerant in a condition where the HVAC system is operating in a normal mode of operation (e.g., cooling or heating mode). In another embodiment, the provided HVAC system and method may determine which circuit is leaking the refrigerant in a condition where the HVAC system is operating in an idle mode (e.g., the compressor is turned off). In yet another embodiment, the provided HVAC system and method may determine which circuit is leaking the refrigerant and initiate an evacuation mode to evacuate at least a portion of the refrigerant from the circuit leaking the refrigerant. In some embodiments, the HVAC system may comprise a plurality of refrigerant circuits, and the HVAC system may selectively evacuate the circuit with the refrigerant leak, while continuing to operate one or more of the remaining circuits.

The provided systems and methods are integrated into the practical application of using a combination of leak detection sensors and one or more loss of charge sensor to identify a location of a leak within the HVAC system. The provided systems and methods provide several practical applications and technical advantages. For example, the provided system and methods provide an improvement to the underlying technology via the leak detection sensors and the one or more loss of charge sensor which may be used to identify one or more circuit comprising a refrigerant leak. The provided systems and methods may further mitigate the refrigerant leak by evacuating the one or more circuit having the leak. Refrigerant leaks reduce the efficiency of the HVAC system and increase energy requirements to operate the system. In the case of A2L or A3 refrigerants, leaks may also trigger frequent alarms that bother the customer. Evacuating the refrigerant within the one or more circuit comprising the refrigerant leak improves the underlying technology by reducing the number of alarms mitigating refrigerant leaks within HVAC system.

In some embodiments, an HVAC system is provided. The HVAC system comprises a condenser, an evaporator, a leak detection sensor, and a first refrigerant circuit. The first refrigerant circuit comprises a first compressor configured to receive a refrigerant. The first refrigerant circuit comprises a first loss of charge sensor configured to acquire a measurement indicative of a saturated suction temperature of the refrigerant in the first refrigerant circuit. The HVAC system comprises a controller comprising a memory and a processor, the memory operable to store a saturated suction temperature threshold value, a gas concentration threshold, and a first predetermined duration. The processor is operatively coupled to the memory and configured to receive, from the leak detection sensor, a measurement indicative of a concentration of the refrigerant, and compare the concentration of the refrigerant to the gas concentration threshold. The processor is further configured to determine that the HVAC system should operate in a leak diagnostic mode if the concentration of the refrigerant exceeds the gas concentration threshold. Wherein during the leak diagnostic mode the processor is configured to turn on the first compressor to compress the refrigerant. The processor is configured to receive, from the first loss of charge sensor, a first measurement indicative of a first saturated suction temperature of the refrigerant. The processor is configured to turn off the first compressor for the first predetermined duration and turn on the first compressor to compress the refrigerant after the first predetermined duration has elapsed. The processor is configured to receive, from the first loss of charge sensor, a second measurement indicative of a second saturated suction temperature of the refrigerant, and determine that the first refrigerant circuit includes a refrigerant leak if a difference between the first saturated suction temperature and the second saturated suction temperature exceeds the saturated suction temperature threshold value.

Certain embodiments of the present disclosure may include some, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Regulations in the HVAC industry are pushing manufacturers to transition away from traditional refrigerants towards low global warming potential (GWP) refrigerants, particularly mildly flammable (A2L) refrigerants and flammable (A3) refrigerants. Currently, there is a need to develop HVAC systems that are optimized for low GWP refrigerants. Notably, in the case of flammable refrigerants, such as A2L and A3 refrigerants, there is a need to develop mitigation systems and methods that can detect the presence of leaked refrigerant and implement strategies for mitigating the leak. HVAC systems using low GWP refrigerants should include a refrigerant detection system (RDS) that sounds an alarm when a leak detection sensor detects the presence of a refrigerant above a threshold concentration. In some instances, the threshold concentration is set to a low value to ensure that even low concentrations of refrigerant leaks are detected and mitigated. However, setting the threshold concentration to low values may result in frequent alarms that bother the users of the HVAC system.

This disclosure addresses the aforementioned problems by providing an HVAC system that can detect the presence of a refrigerant leak and can reduce the number of alarms that are triggered in the HVAC system in response to the detected leak. The provided HVAC system and method may identify a refrigerant leak caused by one or more circuit in the HVAC system and initiate various modes of operation to mitigate the leaked refrigerant and/or evacuate the leaked refrigerant from the circuit identified as causing the leak. In one embodiment, the provided HVAC system and method may determine which circuit is leaking the refrigerant in a condition where the HVAC system is operating in a normal mode of operation (e.g., cooling or heating mode). In another embodiment, the provided HVAC system and method may determine which circuit is leaking the refrigerant in a condition where the HVAC system is operating in an idle mode (e.g., the compressor is turned off). In yet another embodiment, the provided HVAC system and method may determine which circuit is leaking the refrigerant and initiate an evacuation mode to evacuate at least a portion of the refrigerant from the circuit leaking the refrigerant. In some embodiments, the HVAC system may comprise a plurality of refrigerant circuits, and the HVAC system may selectively evacuate the circuit with the refrigerant leak, while continuing to operate one or more of the remaining circuits.

HVAC System

Figure 1A:
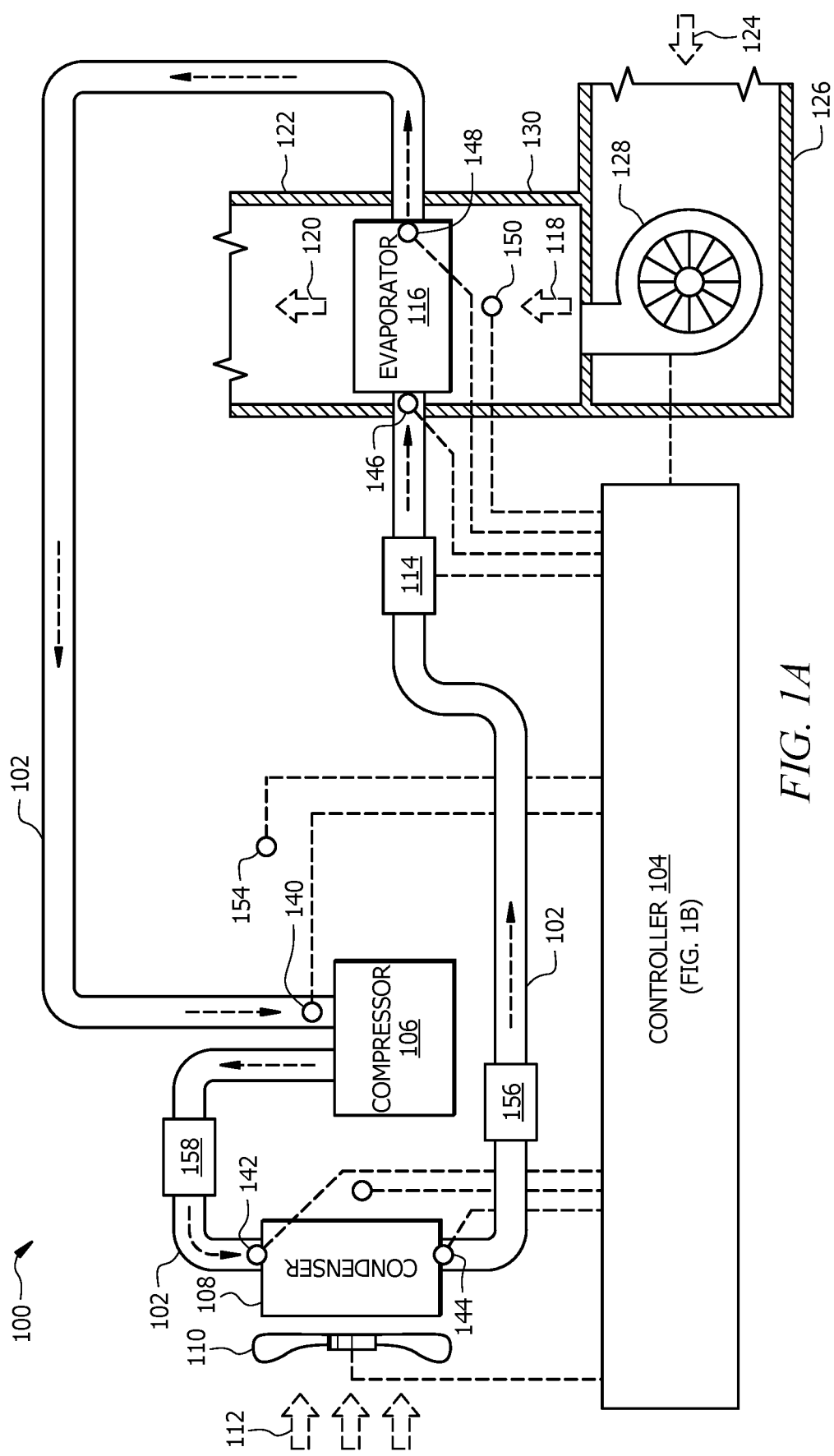
FIG. 1A is a diagram of an HVAC system according to some embodiments of the present disclosure.
Figure 1B:
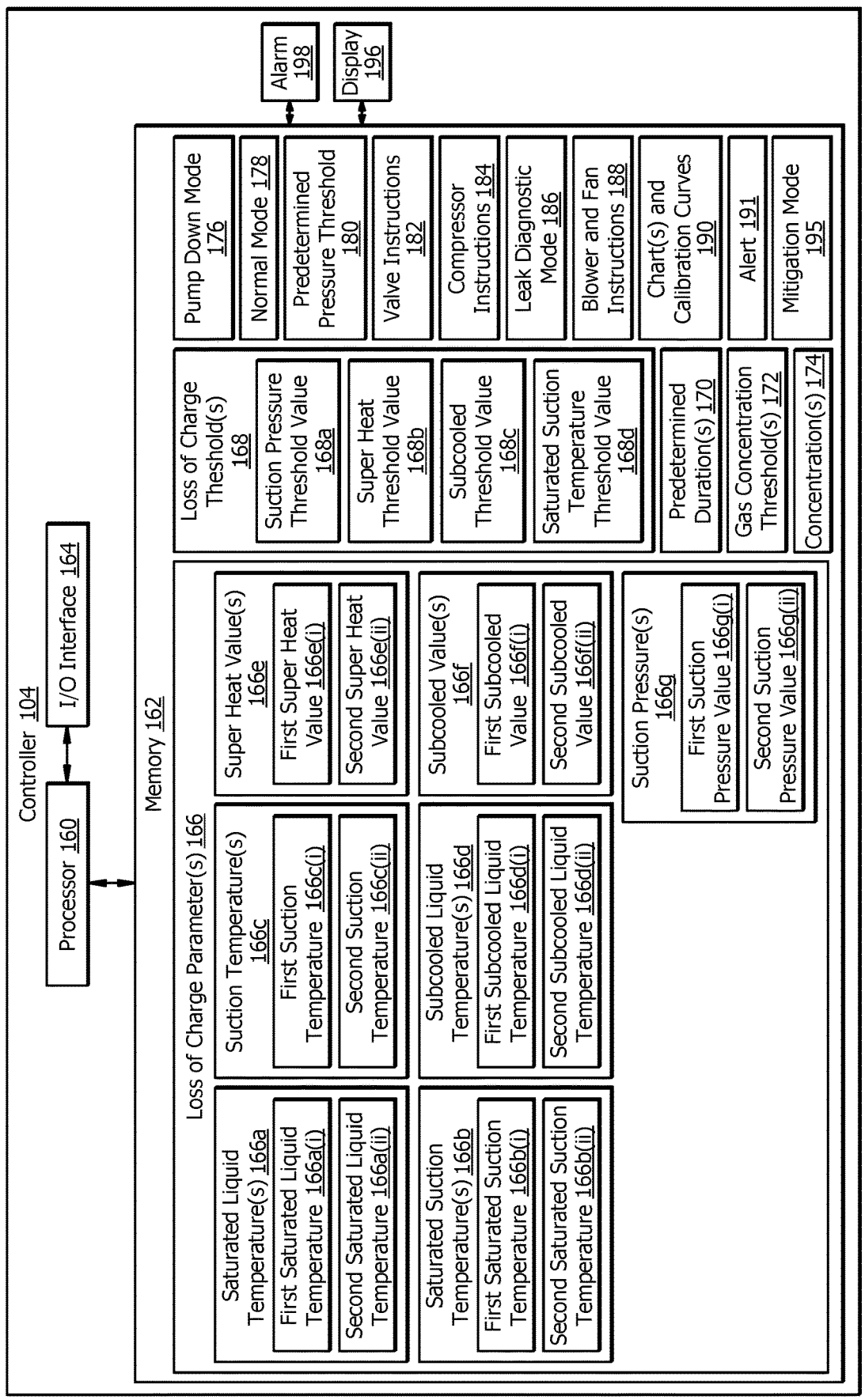
FIG. 1B is a diagram of a controller of the HVAC system according to some embodiments of the present disclosure.

FIGS. 1A-1B and 2-3 show an example HVAC system 100 according to an embodiment of the present disclosure. The HVAC system 100 conditions air for delivery to a conditioned space (e.g., all or a portion of a room, a house, an office building, a warehouse, or the like). In some embodiments, the HVAC system 100 is a rooftop unit (RTU) that is positioned on the roof of a building, and the conditioned air is delivered into the interior of the building. In other embodiments, portion(s) of the HVAC system 100 may be located within the building and portion(s) outside the building. The HVAC system 100 may be configured as shown in FIGS. 1A-B or in any other suitable configuration. For example, the HVAC system 100 may include additional components or may omit one or more components shown in FIG. 1A-B.

In general, the HVAC system 100 includes a working fluid conduit 102, a controller 104, a compressor 106, a condenser 108, a fan 110, an expansion valve 114, an evaporator 116, a blower 128, one or more loss of charge sensor 140-148 (e.g., at least a first loss of charge sensor 140, a second loss of charge sensor 142, a third loss of charge sensor 144, a fourth loss of charge sensor 146, and a fifth loss of charge sensor 148), one or more leak detection sensor 150-154 (e.g., at least a first leak detection sensor 150, a second leak detection sensor 152, and a third leak detection sensor 154), a controllable valve 156, and a pressure relief valve 158.

In some embodiments, the working fluid conduit 102 facilitates the movement of a working fluid (e.g., one or more refrigerants) through a cooling cycle such that the working fluid flows as illustrated by the dashed arrows in FIG. 1A. The working fluid may be any acceptable working fluid including, but not limited to, fluorocarbons (e.g., chlorofluorocarbons), ammonia, non-halogenated hydrocarbons (e.g., propane), or hydrofluorocarbons (e.g., R-410A). In some embodiments, the working fluid comprises a mildly flammable A2L refrigerant.

As used herein, the term "mildly flammable A2L refrigerant" may be defined in one embodiment according to ASHRAE Standard 34. In one example, according to the ASHRAE Standard 34, the mildly flammable A2L refrigerant meets all four of the following conditions: (i) exhibits flame propagation when tested at 140° F. (60° C.) and 14.7 psia (101.3 kPa); (ii) has a lower flammability limit (LFL) >0.0062 lb/ft$^3$ (0.10 kg/m$^3$); (iii) has a heat of combustion <8169 Btu/lb (19,000 KJ/kg); and (iv) has a maximum burning velocity of ≤3.9 in/s (10 cm/s) when tested at 73.4° F. (23° C.) and 14.7 psia (101.3 kPa) in dry air. Suitable examples of mildly flammable A2L refrigerants include, but are not limited to, R-32, R-454b, or combinations thereof.

The compressor 106 is coupled to the working fluid conduit 102 and compresses (i.e., increases the pressure) of the working fluid. The compressor 106 is in signal communication with the controller 104 using wired and/or wireless connection. The controller 104 provides commands and/or signals to control operation of the compressor 106 and/or receive signals from the compressor 106 corresponding to a status of the compressor 106. The compressor 106 may be a single-speed, variable-speed, or multiple stage compressor. A variable-speed compressor is generally configured to operate at different speeds to increase the pressure of the working fluid to keep the working fluid moving along the working fluid conduit 102. In the variable-speed compressor configuration, the speed of compressor 106 can be modified to adjust the cooling capacity of the HVAC system 100. Meanwhile, in the multi-stage compressor configuration, one or more compressors can be turned on or off to adjust the cooling capacity of the HVAC system 100.

Figure 2:
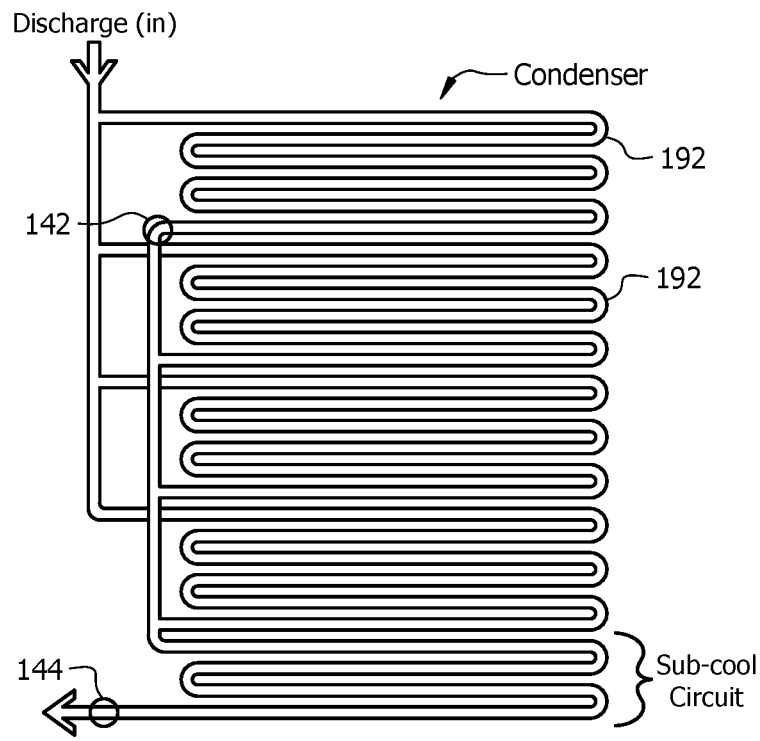
FIG. 2 is a diagram of a condenser of the HVAC system of FIG. 1A-B according to some embodiments of the present disclosure.

The condenser 108 is configured to facilitate movement of the working fluid through the working fluid conduit 102. The condenser 108 is generally located downstream of the compressor 106 and is configured to remove heat from the working fluid. The condenser 108 is generally any heat exchanger configured to transfer heat between airflow 112 flowing across the condenser 108 and the refrigerant flowing through the condenser 108. Referring to FIG. 2, the condenser 108 may include one or more circuits of condenser coils 192 that are configured to receive the working fluid from the compressor 106. The fan 110 is configured to move airflow 112 across the condenser 108 and one or more circuits of condenser coils 192 in the condenser 108. For example, the fan 110 may be configured to blow outside air through the condenser 108 to help cool the working fluid flowing therethrough. The fan 110 may be in communication with the controller 104 (e.g., via wired and/or wireless communication) to receive control signals for turning the fan 110 on and off and/or adjusting a speed of the fan 110. The compressed, cooled working fluid flows from the condenser 108 toward the expansion valve 114.

In some embodiments, the controllable valve 156 is configured downstream of the condenser 108 and may be positioned upstream of the expansion valve 114. The controllable valve 156 may regulate the flow rate of the working fluid exiting the condenser 108. The controllable valve 156 may be in communication with the controller 104 (e.g., via wired and/or wireless communication) to receive control signals for opening and/or closing to regulate the flow of working fluid. In some embodiments, the pressure relief valve 158 is positioned upstream of the controllable valve 156 and downstream of the compressor 106. The pressure relief valve 158 is configured to vent the working fluid from the working fluid conduit 102 if a predetermined pressure threshold 180 is exceeded. In some embodiments, the pressure relief valve 158 is positioned between the compressor 106 and the condenser 108, but may be positioned between the controllable valve 156 and the condenser 108. As will be described below, the controllable valve 156 may be closed during a pump down mode 176 to contain the working fluid between the compressor 106 and the controllable valve 156. If the predetermined pressure threshold 180 is exceeded for the pressure relief valve 158, the working fluid may vent and be evacuated from the HVAC system 100 in the event of a refrigerant leak in the working fluid conduit 102.

The expansion valve 114 is coupled to the working fluid conduit 102 downstream of the condenser 108 and is configured to reduce the pressure of the working fluid. In this way, the working fluid is delivered to the evaporator 116. In general, the expansion valve 114 may be a valve such as an expansion valve or a flow control valve (e.g., a thermostatic expansion valve (TXV)) or any other suitable valve for removing pressure from the working fluid while, optionally, providing control of the rate of flow of the working fluid. The expansion valve 114 may be in communication with the controller 104 (e.g., via wired and/or wireless communication) to receive control signals for opening and/or closing associated valves and/or to provide flow measurement signals corresponding to the rate of working fluid flow through the working fluid conduit 102.

Figure 3:
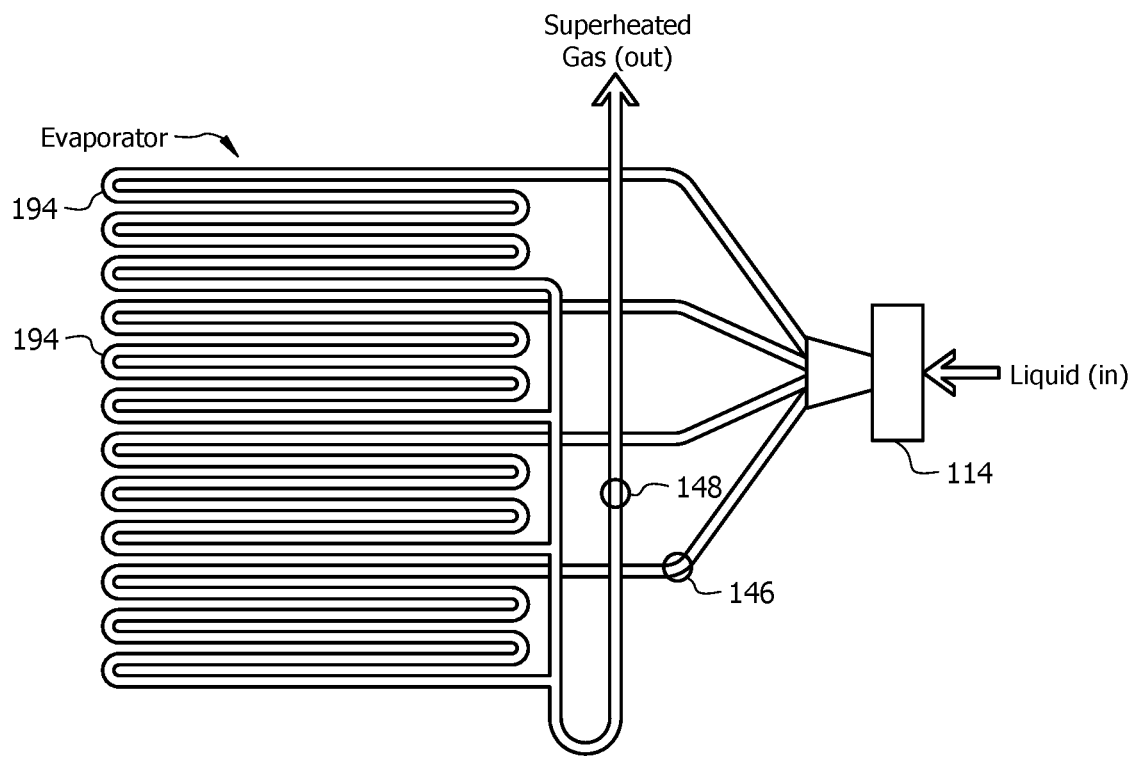
FIG. 3 is a diagram of an evaporator of the HVAC system of FIG. 1A-B according to some embodiments of the present disclosure.

The evaporator 116 is configured to facilitate movement of the working fluid through the working fluid conduit 102. The evaporator 116 is generally any heat exchanger configured to provide heat transfer between airflow 118 flowing across the evaporator 116 and working fluid passing through the interior of the evaporator 116. Referring to FIG. 3, the evaporator 116 may include one or more circuits of evaporator coils 194 that are configured to provide heat transfer between airflow 118 contacting an outer surface of one or more evaporator coils 194 and the working fluid flowing therethrough. The evaporator 116 is fluidically connected to the compressor 106, such that working fluid generally flows from the evaporator 116 to the compressor 106 when the HVAC system 100 is operating to provide cooling.

A portion of the HVAC system 100 is configured to move airflow 118 provided by the blower 128 across the evaporator 116 and out of a duct system 122 as conditioned airflow 120. Return air 124, which may be air returning from the building, fresh air from outside, or some combination, is pulled into a return duct 126. A suction side of the blower 128 pulls the return air 124. The blower 128 discharges the airflow 118 into a duct 130 such that the airflow 118 crosses the evaporator 116 to produce the conditioned airflow 120. The blower 128 may include any mechanism for providing the airflow 118 through the HVAC system 100. For example, the blower 128 may be a constant speed or variable speed circulation blower or fan. Examples of a variable speed blower include, but are not limited to, belt-drive blowers controlled by inverters, direct-drive blowers with electronic commuted motors (ECM), or any other suitable type of blower.

FIG. 1A illustrates the HVAC system 100 operating in a normal mode 178 of operation that provides cooling. In some embodiments, the HVAC system 100 may be operated as a heat pump during the normal mode to provide heating. Generally, when the HVAC system 100 is operating to provide heating, the flow of refrigerant is reversed, such that the condenser 108 acts an evaporator and the evaporator 116 acts as a condenser to heat the flow of air passing therethrough. If the HVAC system 100 is configured to operate as a heat pump, the HVAC system 100 may include a reversing valve to reverse the flow of working fluid through the HVAC system 100 during operation in the heating mode and an outdoor expansion device for expanding the working fluid provided to the condenser 108, which acts an evaporator in the heating mode. During the heating mode, the HVAC system 100 may include a heating element to provide supplemental and/or backup heating to the flow of air.

The at least one loss of charge sensors 140-148 are configured to measure one or more loss of charge parameter 166 of the working fluid flowing through the HVAC system 100. In some embodiments, the one or more loss of charge sensors 140-148 includes a first loss of charge sensor 140. The first loss of charge sensor 140 may be a pressure sensor configured to acquire a measurement indicative of a suction pressure 166g of the working fluid. In some embodiments, the first loss of charge sensor 140 is positioned proximate to an inlet of the compressor 106. While the first loss of charge sensor 140 is illustrated near the inlet of the compressor 106 in FIG. 1A, the first loss of charge sensor 140 may be located at any position in the working fluid conduit 102 between the evaporator 116 and the compressor 106. As will be detailed below, a loss of suction pressure 166g of the working fluid while the HVAC system 100 operates in an idle mode (e.g., when the compressor 106 is turned off) may be indicative of a loss of charge of the working fluid (i.e., a refrigerant leak in the working fluid conduit 102 of the HVAC system 100). The first loss of charge sensor 140 may be in wired and/or wireless signal communication with controller 104 to provide signals corresponding to the one or more suction pressures 166g measured by the first loss of charge sensor 140.

The one or more loss of charge sensors 140-148 may include a second loss of charge sensor 142. The second loss of charge sensor 142 may be configured to acquire a measurement indicative of a saturated liquid temperature 166a of the working fluid flowing in the condenser 108, and may be configured to provide a corresponding saturated liquid temperature signal to the controller 104. As used herein, a "saturated liquid" may refer to a working fluid in the liquid state that is in thermodynamic equilibrium with the vapor state of the fluid for a given pressure. A "saturated liquid" is said to be at the saturation temperature for a given pressure. If the temperature of a saturated liquid is increased above the saturation temperature, the saturated liquid generally begins to vaporize. In some embodiments, the second loss of charge sensor 142 is a temperature sensor such as a thermocouple or a thermistor. As shown in FIG. 2, when the second loss of charge sensor 142 is a temperature sensor, the temperature sensor may be positioned in the circuit of condenser coils 192. For example, the temperature sensor may be positioned in a location within the circuit of condenser coils 192 where the refrigerant is a saturated liquid (e.g., approximately at the center of the length of a circuit in the condenser 108). In some embodiments, the second loss of charge sensor 142 is a pressure sensor. When the second loss of charge sensor 142 is a pressure sensor, the saturated liquid temperature 166a may be measured indirectly via a measure of saturation pressure. The saturation pressure may be converted to the saturated liquid temperature 166a using a pressure-temperature chart for a given refrigerant, which may be stored in a memory 162 of the controller 104. If needed, a correction factor may be applied to obtain the saturated liquid temperature. For example, the pressure-temperature chart may include the respective saturated liquid temperature 166a for a range of pressures of a given refrigerant. When the second loss of charge sensor 142 is a pressure sensor, the pressure sensor may be positioned at any location between the compressor 106 and the expansion valve 114.

The one or more loss of charge sensors 140-148 may include a third loss of charge sensor 144. The third loss of charge sensor 144 may be configured to acquire a measurement indicative of a subcooled liquid temperature 166d of the working fluid in and/or exiting the condenser 108, and may be configured to provide a corresponding subcooled liquid temperature signal to the controller 104. A "subcooled liquid" may refer to a fluid in the liquid state that is cooled below the saturation temperature of the fluid at a given pressure. The third loss of charge sensor 144 may be a temperature sensor such as a thermocouple or a thermistor. Referring to FIG. 2, the third loss of charge sensor 144 may be located on or near an exit of a subcooled circuit of the condenser 108 adjacent the outlet of the condenser 108. In some embodiments, the third loss of charge sensor is positioned at any location between the condenser 108 and the expansion valve 114. The second loss of charge sensor 142 and the third loss of charge sensor 144 may be attached on or within the condenser 108 and/or the working fluid conduit 102 using any appropriate means (e.g., clamps, adhesives, or the like).

As will be detailed below, the controller 104 may determine a subcooled value 166f based on a difference between the subcooled liquid temperature 166d and the saturated liquid temperature 166a. The subcooled value 166f may be indicative of a loss of charge (i.e., a refrigerant leak) in the working fluid conduit 102 of the HVAC system 100. For example, a subcooled value 166f that falls at or below a subcooled threshold value 168c may be indicative of a loss of charge of the refrigerant in the HVAC system 100.

The one or more loss of charge sensors 140-148 may include a fourth loss of charge sensor 146. The fourth loss of charge sensor 146 may be configured to measure one or more saturated suction temperatures 166b of the working fluid, and may be configured to provide a corresponding saturated suction temperature signal to the controller 104. The fourth loss of charge sensor 146 may be a temperature sensor such as a thermocouple or a thermistor. When the fourth loss of charge sensor 146 is a temperature sensor, the temperature sensor may be positioned proximate to an inlet of the evaporator 116, or at any position between the expansion valve 114 and an outlet of the evaporator 116, as shown in FIG. 3. In some embodiments, the temperature sensor is positioned in the one or more evaporator coils 194 where the refrigerant exists in two phases. In some embodiments, the fourth loss of charge sensor 146 is a pressure sensor. The pressure sensor may measure the saturated suction temperature 166b indirectly via a measure of saturation pressure, as described above. When the fourth loss of charge sensor 146 is a pressure sensor, the pressure sensor may be positioned at any location in the working fluid conduit 102 between the expansion valve 114 and the compressor 106. As will be detailed below, an increase over time of the saturated suction temperature 166b during operation of the HVAC system 100 may be indicative of a loss of charge of the refrigerant in the working fluid conduit 102. When converting the pressure to temperature using additional tables, a correction factor may be applied, if needed.

The one or more loss of charge sensors 140-148 may include a fifth loss of charge sensor 148. The fifth loss of charge sensor 148 may be configured to measure one or more suction temperatures 166c of the working fluid, and may be configured to provide a corresponding suction temperature signal to the controller 104. The fifth loss of charge sensor 148 may be a temperature sensor such as a thermocouple or a thermistor. Referring to FIG. 3, the fifth loss of charge sensor 148 may be located on or near the outlet of the evaporator 116. For instance, the fifth loss of charge sensor 148 may be located in a portion of the evaporator 116 containing a superheated vapor working fluid leading towards the compressor 106. A "superheated vapor" may refer to a fluid in the vapor state that is heated to a temperature that is greater than the saturation temperature of the fluid at a given pressure. In some embodiments, the fifth loss of charge sensor 148 is positioned at any location between the evaporator 116 and the compressor 106. The fourth loss of charge sensor 146 and the fifth loss of charge sensor 148 may be attached on or within the evaporator 116 or working fluid conduit 102 using any appropriate means (clamps, adhesives, or the like).

As will be detailed below, the controller 104 may determine a super heat value $166e$ based on a difference between the suction temperature $166c$ and the saturated suction temperature $166b$. An increase in the super heat value $166e$ may be indicative of a loss of charge (i.e., a refrigerant leak) in the working fluid conduit 102 of the HVAC system 100. For example, a super heat value $166e$ that is at or exceeds a super heat threshold value $168bc$ may be indicative of a loss of charge of the refrigerant in the HVAC system 100.

The HVAC system 100 may include one or more leak detection sensors 150-154 configured to acquire a measurement indicative of a concentration of refrigerant that has leaked from one or more component of the HVAC system 100. In some embodiments, the one or more leak detection sensors 150-154 includes a first leak detection sensor 150 configured to acquire a measurement indicative of a concentration of the refrigerant that has leaked into the indoor unit, where the first leak detection sensor 150 is configured to provide a corresponding measurement signal to the controller 104. In some embodiments, the first leak detection sensor 150 may be positioned adjacent to the evaporator 116 or within the duct system 122. The one or more leak detection sensors 150-154 may include a second leak detection sensor 152 configured to acquire a measurement indicative of a concentration 174 of the refrigerant that has leaked from the outdoor unit. The second leak detection sensor 152 may be configured to provide a corresponding measurement signal to the controller 104. In some embodiments, the second leak detection sensor 152 may be positioned proximate to the condenser 108. The one or more leak detection sensors 150-154 may include a third leak detection sensor 154 configured to acquire a measurement indicative of a concentration of the refrigerant that has leaked from a control panel unit. The third leak detection sensor 154 may be configured to provide a corresponding measurement signal to the controller 104. In some embodiments, the third leak detection sensor 154 may be positioned proximate to the compressor 106 or controller 104. Although FIG. 1A illustrates only three leak detection sensors, it is to be appreciated that any number of leak detection sensors may be used in the HVAC system 100 to detect a refrigerant leak, and the leak detection sensors may be positioned at any location within the HVAC system 100.

In some embodiments, the one or more leak detection sensors 150-154 are speed of sound sensors. The speed of sound sensor may include a transmitter configured to emit a sonic signal through the air to a receiver at a known distance. The speed of sound sensor measures a travel time of the sonic signal between the transmitter and the receiver as it travels through the air to determine a speed of sound (e.g., acoustic velocity) of the sonic signal in the air. The speed of sound sensor is configured to detect working fluid that leaks into the air because the working fluid leak will change the density of the air, which will in turn change the travel time of the sonic signal through the air. The speed of sound sensor can measure the change in the speed of sound through the air. The change of the speed of sound is indicative of the refrigerant leak, and the controller 104 may compare the measured value to a calibration curve 190 to generate a concentration 174 of the working fluid that has leaked from the HVAC system 100. The calibration curve 190 can be constructed and stored in the controller 104 by measuring speed of sound values for known concentrations of refrigerants. In some embodiments, the speed of sound sensor takes a baseline measurement when no gas leak is present in the air and the controller 104 stores a reference speed of sound measurement for air. The change in the speed of sound measurement may be determined by the difference between the measured speed of sound value through the air and the baseline measurement, or difference between the measured speed of sound value and the reference speed of sound measurement.

In some embodiments, the one or more leak detection sensors 150-154 are thermal conductivity sensors. The thermal conductivity sensors are configured to detect a change in thermal conductivity due to the working fluid leak relative to the thermal conductivity of air. Alternatively, the thermal conductivity sensor may detect the change in the thermal conductivity relative to a reference thermal conductivity of a known reference gas (e.g., nitrogen) in a sealed reference chamber. The thermal conductivity sensor may include an electrically heated filament in a detector body. When air enters the detector body the filament heats up and a resistance Is measured. For example, the filament may be arranged in a Wheatstone bridge circuit so that the presence of the air in the detector body produces a measurable resistance. Air containing the working fluid leak will result in a change in the resistance measured. In some embodiments, the thermal conductivity sensor takes a baseline measurement when no gas leak is present in the air and the controller 104 stores a reference thermal conductivity measurement for air. The change in the thermal conductivity may be determined by the difference between the measured thermal conductivity value and the baseline measurement, or the difference between the measured thermal conductivity value and the reference thermal conductivity measurement. The thermal conductivity sensor can measure the change in the resistance, and the controller 104 may compare the measured value to a calibration curve 190 to generate a concentration 174 of the working fluid leak. The calibration curve 190 can be constructed and stored in the controller 104 by measuring thermal conductivity for known concentrations of refrigerants. The calibration curves 190 can be constructed for a range of temperatures and pressures. As will be detailed below, the controller 104 may compare a concentration 174 of the refrigerant to a gas concentration threshold 172 to determine if a working fluid has leaked from the working fluid conduit 102 or any other component in the HVAC system 100. In one non-limiting example, the gas concentration threshold 172 is set to 12% of the lower flammability limit (LFL) of the refrigerant.

As shown in FIG. 1B, the controller 104 is communicatively coupled (e.g., via wired and/or wireless connection) to components in the HVAC system 100 and configured to control their operation. In some embodiments, controller 104 can be one or more controllers associated with one or more components of the HVAC system 100. The controller 104 includes a processor 160, memory 162, and an input/output (I/O) interface 164. The controller 104 may communicate with a display 196, which may be configured to display an alert 191 or notification that indicates that a refrigerant leak is present in the HVAC system 100. In some embodiments, the controller 104 may communicate with an alarm 198, which may produce an alarm sound in response to the controller 104 determining the presence of a refrigerant leak in the HVAC system 100. In some embodiments, the display 196 and/or the alarm 198 is included in a thermostat that is in communication with the HVAC system 100.

The processor 160 comprises one or more processors operably coupled to the memory 162. The processor 160 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs) that communicatively couples to memory 162 and controls the operation of HVAC system 100. The processor 160 may be a programmable logic device, a microcontroller, a microprocessor, or any suitable combination of the preceding. The processor 160 is communicatively coupled to and in signal communication with the memory 162. The one or more processors are configured to process data and may be implemented in hardware or software. For example, the processor 160 may be 8-bit, 16-bit, 32-bit, 64-bit or of any other suitable architecture. The processor 160 may include an arithmetic logic unit (ALU) for performing arithmetic and logic operations, processor registers that supply operands to the ALU and store the results of ALU operations, and a control unit that fetches instructions from memory 162 and executes them by directing the coordinated operations of the ALU, registers, and other components. The processor 160 may include other hardware and software that operates to process information, control the HVAC system 100, and perform any of the functions described herein. The processor 160 is not limited to a single processing device and may encompass multiple processing devices.

The memory 162 includes one or more disks, tape drives, or solid-state drives, and may be used as an over-flow data storage device, to store programs when such programs are selected for execution, and to store instructions and data that are read during program execution. The memory 162 may be volatile or non-volatile and may comprise ROM, RAM, ternary content-addressable memory (TCAM), dynamic random-access memory (DRAM), and static random-access memory (SRAM). The memory 162 is operable to store any suitable set of instructions, logic, rules, and/or code for executing the functions described in this disclosure. For example, the memory 162 may store loss of charge parameters 166 (e.g., saturated liquid temperatures 166a, saturated suction temperatures 166b, suction temperatures 166c, subcooled liquid temperatures 166d, super heat values 166e, subcooled values 166f, and suction pressures 166g), loss of charge thresholds 168 (e.g., suction pressure threshold value 168a, super heat threshold value 168b, subcooled threshold value 168c, and saturated suction temperature threshold value 168d), predetermined duration 170, gas concentration thresholds 172, concentrations 174 of the refrigerant, pump down mode 176 instructions, normal mode 178 instructions, predetermined pressure threshold 180, valve instructions 182, compressor instructions 184, leak diagnostic mode 186 instructions, blower and fan instructions 188, charts and calibration curves 190, alerts 191, and mitigation mode 195 instructions.

The I/O interface 164 is configured to communicate data and signals with other devices. For example, the I/O interface 164 may be configured to communicate electrical signals with the other components of the HVAC system 100. The I/O interface 164 may comprise ports and/or terminals for establishing signal communications between the controller 104 and other devices. The I/O interface 164 may be configured to enable wired and/or wireless communications. Connections between various components of the HVAC system 100 and between components of HVAC system 100 may be wired or wireless. For example, conventional cable and contacts may be used to couple the various components of the HVAC system 100, including, the compressor 106, the fan 110, the expansion valve 114, the blower 128, the one or more loss of charge sensors 140-148, the one or more leak detection sensors 150-154, the display 196, and the alarm 198. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other.

As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 104 to other components of the HVAC system 100.

Figure 4:
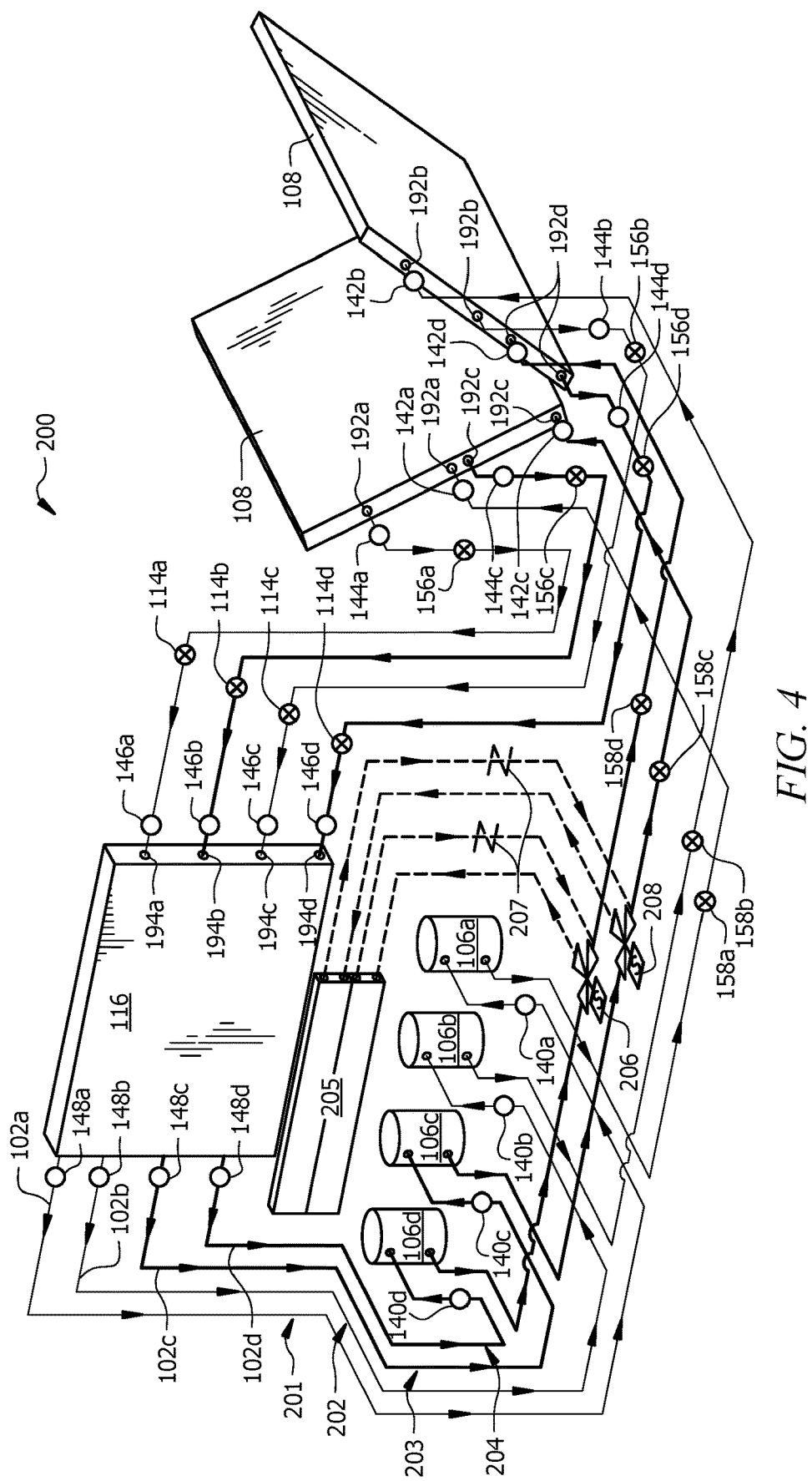
FIG. 4 is diagram of the HVAC system according to some embodiments of the present disclosure.

FIG. 4 shows an example HVAC system 200 according to an embodiment of the present disclosure. The HVAC system 200 includes multiple refrigerant circuits (e.g., at least a first refrigerant circuit 201, a second refrigerant circuit 202, a third refrigerant circuit 203, and a fourth refrigerant circuit 204). Each of the refrigerant circuits 201-204 may include the same or similar components as compared to the singular refrigerant circuit in the HVAC system 100. For example, the first refrigerant circuit 201 may include a first working fluid conduit 102a that facilitates movement of a working fluid through a cooling cycle as illustrated by arrows in FIG. 4. The first refrigerant circuit 201 may include a first compressor 106a coupled to the first working fluid conduit 102a. The first compressor 106a may be configured to compress the working fluid and circulate the working fluid to a first circuit of condenser coils 192a positioned in the condenser 108. A first expansion valve 114a may be coupled to the first working fluid conduit 102a downstream of the first circuit of condenser coils 192a. The first expansion valve 114a may be configured to receive the working fluid from the first circuit of condenser coils 192a and reduce the pressure of the working fluid. A first circuit of evaporator coils 194a is positioned in the evaporator 116 and configured to receive the working fluid from the first expansion valve 114a. The working fluid exiting the first circuit of evaporator coils 194a may be received by the first compressor 106a. In some embodiments, the first refrigerant circuit 201 includes a first controllable valve 156a configured downstream of the condenser 108, and a first pressure relief valve 158a positioned upstream of the first controllable valve 156a.

The first refrigerant circuit 201 may include one or more loss of charge sensors 140a-148a. For example, the first refrigerant circuit 201 may include a first loss of charge sensor 140a configured to acquire a measurement indicative of a suction pressure 166g of the working fluid. The first refrigerant circuit 201 may include a second loss of charge sensor 142a configured to acquire a measurement indicative of a saturated liquid temperature 166a. The first refrigerant circuit 201 may include a third loss of charge sensor 144a configured to acquire a measurement indicative of a subcooled liquid temperature 166d. The first refrigerant circuit 201 may include a fourth loss of charge sensor 146a configured to acquire a measurement indicative of a saturated suction temperature 166b of the working fluid. The first refrigerant circuit 201 may include a fifth loss of charge sensor 148a configured to acquire a measurement indicative of a suction temperature 166c of the working fluid.

The second refrigerant circuit 202 may include a second compressor 106b coupled to a second working fluid conduit 102b. The second compressor 106b may be configured to compress the working fluid and circulate the working fluid to a second circuit of condenser coils 192b positioned in the condenser 108. A second expansion valve 114b may be coupled to the second working fluid conduit 102b downstream of the second circuit of condenser coils 192b. The second expansion valve 114b may be configured to receive the working fluid from the second circuit of condenser coils 192b and reduce the pressure of the working fluid. A second circuit of evaporator coils 194b is positioned in the evaporator 116 and configured to receive the working fluid from the second expansion valve 114b. The working fluid exiting the second circuit of evaporator coils 194b may be received by the second compressor 106b. In some embodiments, the second refrigerant circuit 202 includes a second controllable valve 156b configured downstream of the condenser 108, and a second pressure relief valve 158b positioned upstream of the second controllable valve 156b.

The second refrigerant circuit 202 may include one or more loss of charge sensors 140b-148b. For example, the second refrigerant circuit 202 may include a first loss of charge sensor 140b configured to acquire a measurement indicative of a suction pressure 166g of the working fluid. The second refrigerant circuit 202 may include a second loss of charge sensor 142b configured to acquire a measurement indicative of a saturated liquid temperature 166a. The second refrigerant circuit 202 may include a third loss of charge sensor 144b configured to acquire a measurement indicative of a subcooled liquid temperature 166d. The second refrigerant circuit 202 may include a fourth loss of charge sensor 146b configured to acquire a measurement indicative of a saturated suction temperature 166b of the working fluid. The second refrigerant circuit 202 may include a fifth loss of charge sensor 148b configured to acquire a measurement indicative of a suction temperature 166c of the working fluid.

The third refrigerant circuit 203 may include a third compressor 106c coupled to a third working fluid conduit 102c. The third compressor 106c may be configured to compress the working fluid and circulate the working fluid to a third circuit of condenser coils 192c positioned in the condenser 108. In some embodiments, the HVAC system 200 includes a reheat coil 205 configured to receive the working fluid from the third compressor 106c. The reheat coil 205 may be configured to heat the working fluid to control the humidity of the conditioned airflow 120. A valve 206 may be positioned between the reheat coil 205 and the third compressor 106c. The valve 206 may regulate the flow of the working fluid from the third compressor 106c to the reheat coil 205. The working fluid exiting the reheat coil 205 is transported to the third circuit of condenser coils 192c. In some embodiments, a check valve 207 is positioned between the reheat coil 205 and the third circuit of condenser coils 192c. A third expansion valve 114c may be coupled to the third working fluid conduit 102c downstream of the third circuit of condenser coils 192c. The third expansion valve 114c may be configured to receive the working fluid from the third circuit of condenser coils 192c and reduce the pressure of the working fluid. A third circuit of evaporator coils 194c is positioned in the evaporator 116 and configured to receive the working fluid from the third expansion valve 114c. The working fluid exiting the third circuit of evaporator coils 194c may be received by the third compressor 106c. In some embodiments, the third refrigerant circuit 203 includes a third controllable valve 156c configured downstream of the condenser 108, and a third pressure relief valve 158c positioned upstream of the third controllable valve 156c.

The third refrigerant circuit 203 may include one or more loss of charge sensors 140c-148c. For example, the third refrigerant circuit 203 may include a first loss of charge sensor 140c configured to acquire a measurement indicative of a suction pressure 166g of the working fluid. The third refrigerant circuit 203 may include a second loss of charge sensor 142c configured to acquire a measurement indicative of a saturated liquid temperature 166a. The third refrigerant circuit 203 may include a third loss of charge sensor 144c configured to acquire a measurement indicative of a subcooled liquid temperature 166d. The third refrigerant circuit 203 may include a fourth loss of charge sensor 146c configured to acquire a measurement indicative of a saturated suction temperature 166b of the working fluid. The third refrigerant circuit 203 may include a fifth loss of charge sensor 148c configured to acquire a measurement indicative of a suction temperature 166c of the working fluid.

The fourth refrigerant circuit 204 may include a fourth compressor 106d coupled to a fourth working fluid conduit 102d. The fourth compressor 106d may be configured to compress the working fluid and circulate the working fluid to a fourth circuit of condenser coils 192d positioned in the condenser 108. In some embodiments, the HVAC system 200 includes a reheat coil 205 configured to receive the working fluid from the fourth compressor 106d. The reheat coil 205 may be configured to heat the working fluid to control the humidity of the conditioned airflow 120. A valve 208 may be positioned between the reheat coil 205 and the fourth compressor 106d. The valve 208 may regulate the flow of the working fluid from the fourth compressor 106d to the reheat coil 205. The working fluid exiting the reheat coil 205 is transported to the fourth circuit of condenser coils 192d. In some embodiments, a check valve 207 is positioned between the reheat coil 205 and the fourth circuit of condenser coils 192d. A fourth expansion valve 114d may be coupled to the fourth working fluid conduit 102d downstream of the fourth circuit of condenser coils 192d. The fourth expansion valve 114d may be configured to receive the working fluid from the fourth circuit of condenser coils 192d and reduce the pressure of the working fluid. A fourth circuit of evaporator coils 194d is positioned in the evaporator 116 and configured to receive the working fluid from the fourth expansion valve 114d. The working fluid exiting the fourth circuit of evaporator coils 194d may be received by the fourth compressor 106d. In some embodiments, the fourth refrigerant circuit 204 includes a fourth controllable valve 156d configured downstream of the condenser 108, and a fourth pressure relief valve 158d positioned upstream of the fourth controllable valve 156d.

The fourth refrigerant circuit 204 may include one or more loss of charge sensors 140d-148d. For example, the fourth refrigerant circuit 204 may include a first loss of charge sensor 140d configured to acquire a measurement indicative of a suction pressure 166g of the working fluid. The fourth refrigerant circuit 204 may include a second loss of charge sensor 142d configured to acquire a measurement indicative of a saturated liquid temperature 166a. The fourth refrigerant circuit 204 may include a third loss of charge sensor 144d configured to acquire a measurement indicative of a subcooled liquid temperature 166d. The fourth refrigerant circuit 204 may include a fourth loss of charge sensor 146c configured to acquire a measurement indicative of a saturated suction temperature 166b of the working fluid. The fourth refrigerant circuit 204 may include a fifth loss of charge sensor 148c configured to acquire a measurement indicative of a suction temperature 166c of the working fluid.

Method of Operation

Figure 5:
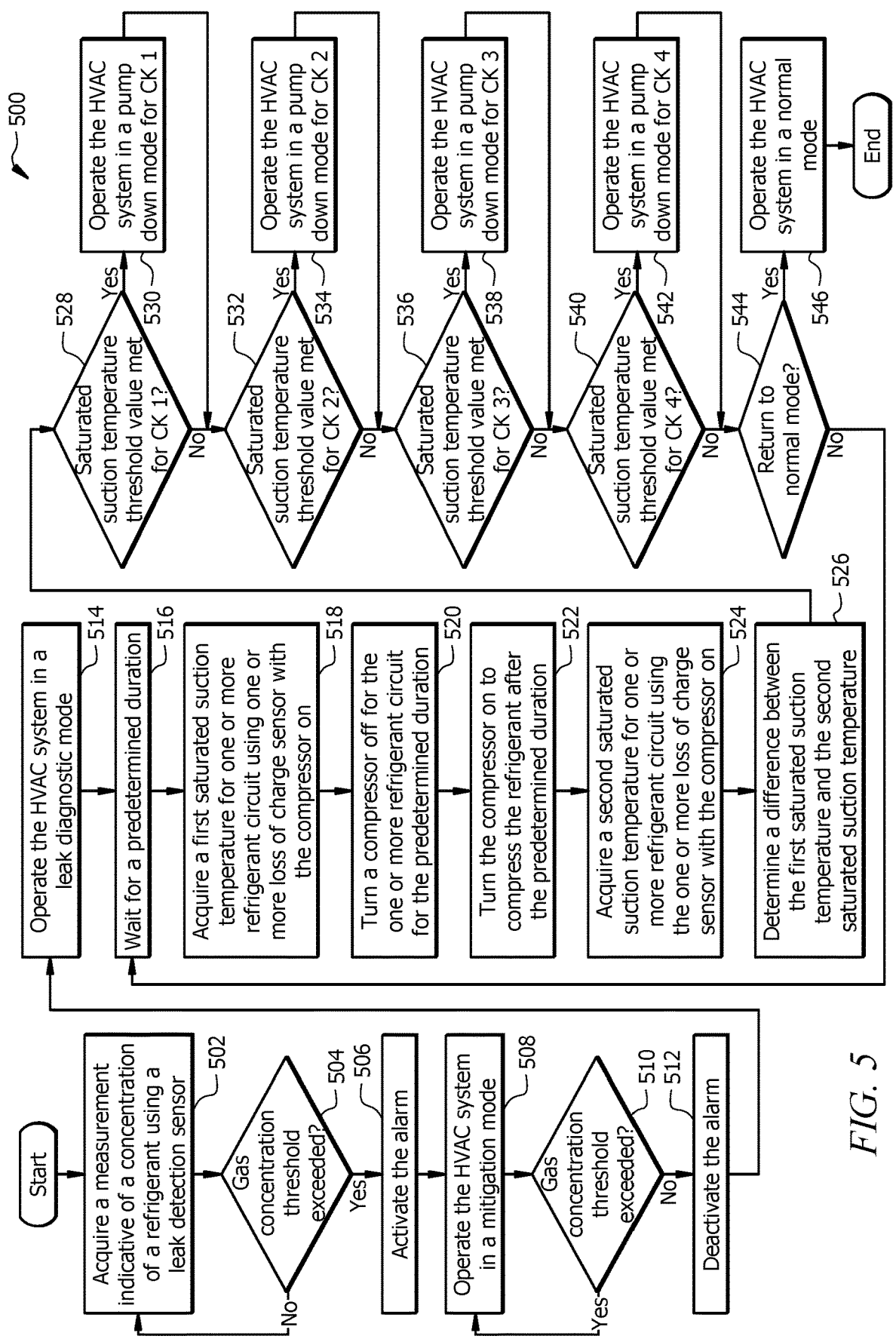
FIG. 5 is a flowchart of an example method of operating the HVAC systems of FIGS. 1-4 according to some embodiments of the present disclosure.

FIG. 5 illustrates an example operational flow 500 for operating the HVAC systems 100, 200 of FIGS. 1-4. In general, the operational flow 500 may be used to detect one or more refrigerant leak in the HVAC systems 100, 200 using a saturated suction temperature 166b. In some embodiments, the operational flow 500 may be used to determine if one or more refrigerant circuits 201-204 include a refrigerant leak. Once a refrigerant leak is detected, the refrigerant circuit 201-204 including the refrigerant leak may be evacuated from the refrigerant circuit 201-204 using the pump down mode 176 of operation.

The operational flow 500 can logically be described in four parts. The first part includes operations 502-506, which generally includes acquiring a measurement indicative of a concentration 174 of refrigerant using the one or more leak detection sensors 150-154 and determining whether the concentration 174 of the refrigerant exceeds a gas concentration threshold 172. If the concentration 174 of the refrigerant exceeds the gas concentration threshold 172, the first part further includes activating the alarm 198, and proceeding to the second part of operational flow 500.

The second part includes operations 508-512, which generally includes operating the HVAC system 100, 200 in a mitigation mode 195 (e.g., compressor 106a-d off, blower 128 on, and fans 110 on) to mitigate the refrigerant leak within the HVAC system 100, 200 and determining if the concentration 174 of the refrigerant still exceeds gas concentration threshold 172 after operating the HVAC system 100, 200 in the mitigation mode 195. If the concentration 174 of the refrigerant is below the gas concentration threshold 172 after operating the HVAC system 100, 200 in the mitigation mode 195, the second part may proceed to deactivate the alarm 198 and proceed to the third part of operational flow 500.

The third part includes operations 514-526, and may start by operating the HVAC system 100, 200 in a leak diagnostic mode 186 to determine if one or more refrigerant circuits 201-204 include a refrigerant leak. The third part may include turning the compressor 106a-106d on in the leak diagnostic mode 186, and waiting for a predetermined duration 170 before acquiring at least a first saturated suction temperature 166b (i) for one or more refrigerant circuit 201-204 using one or more loss of charge sensor 146a-d. The third part may further include turning the compressor 106a-106d off for a predetermined duration 170 before acquiring at least a second saturated suction temperature 166b (ii) for the one or more refrigerant circuit 201-204 using the loss of charge sensor 146a-d. The third part of operational flow 500 may further include determining a difference between the first saturated suction temperature 166b (i) and the second saturated suction temperature 166b (ii) before proceeding to the fourth part of operational flow 500.

The fourth part includes operations 528-546, which generally includes determining whether a refrigerant leak is present in one or refrigerant circuit 201-204. The fourth part may include determining that a refrigerant leak is present in the one or more refrigerant circuits 201-204 if the difference between the first saturated suction temperature 166b (i) and the second saturated suction temperature 166b (ii) measured for the one or more refrigerant circuit 201-204 exceeds a saturated suction temperature threshold value 168d. If the saturated suction temperature threshold value 168d is exceeded, the fourth part of operational flow 500 may further include evacuating each refrigerant circuit 201-204 exceeding the threshold using in a pump down mode 176.

At operation 502, the operational flow 500 includes acquiring a measurement indicative of a concentration 174 of the refrigerant using the one or more leak detection sensors 150-154. For example, a first leak detection sensor 150 may be positioned adjacent to the evaporator 116 or within the duct system 122. The first leak detection sensor 150 may be configured to acquire a measurement indicative of a concentration 174 of the refrigerant in the indoor unit of the HVAC system 100, 200. In some embodiments, a second leak detection sensor 152 may be positioned proximate to the condenser 108. The second leak detection sensor 152 may be configured to acquire a measurement indicative of a concentration 174 of the refrigerant in the outdoor unit of the HVAC system 100, 200. In some embodiments, a third leak detection sensor 154 may be positioned proximate to the compressor 106 or controller 104. The third leak detection sensor 154 may be configured to acquire a measurement indicative of a concentration 174 of the refrigerant in the control panel unit of the HVAC system 100, 200.

At decision block 504, the operational flow 500 includes determining whether the concentration 174 of the refrigerant exceeds a gas concentration threshold 172. In some embodiments, the controller 104 may receive a measurement from the one or more leak detection sensors 150-154 that is indicative of the concentration 174 of the refrigerant. As described in detail above, the one or more leak detection sensor 150-154 may be a thermal conductivity sensor, a speed of sound sensor, or any other suitable refrigerant leak detection sensor technology. The controller 104 may receive the change in thermal conductivity and/or speed of sound of the air surrounding the one or more leak detection sensor 150-154 to determine a first concentration 174a of refrigerant. Decision block 504 may further include using the controller 104 to compare the first concentration 174a of the refrigerant to a gas concentration threshold 172. In some embodiments, the gas concentration threshold 172 is 12% of a lower flammability limit (LFL) of the refrigerant. In some embodiments, the gas concentration threshold 172 can be a constant value which is less than the lower flammability limit (LFL) of the refrigerant. If the concentration 174 of the refrigerant exceeds the gas concentration threshold 172, then the operational flow 500 may proceed to operation 506. At operation 506, the operational flow 500 includes activating an alarm 198. For example, the controller 104 may be configured to cause the alarm 198 to produce an audio or visual indication to alert the user that the gas concentration threshold 172 is exceeded.

At operation 508, the operational flow 500 includes operating the HVAC system 100, 200 in a mitigation mode 195. During the mitigation mode 195, the HVAC system 100, 200 may activate the blower 128 and/or the fan 110 in attempts to use airflow to mitigate the leaked refrigerant from accumulating within the HVAC system 100, 200. For example, in response to determining that the concentration 174 of the refrigerant exceeds the gas concentration threshold 172, the HVAC system 100, 200 may operate in the mitigation mode 195, which includes turning the compressor 106a-106d off, turning the blower 128 on, and optionally turning fan 110 on to mitigate the accumulation of the leaked refrigerant within the HVAC system 100, 200.

At decision block 510, the operational flow 500 includes determining whether the concentration 174 of the refrigerant continues to exceed the gas concentration threshold 172 after operating in the mitigation mode 195 for a duration. For example, decision block 510 may include using the one or more leak detection sensors 150-154 to acquire a second measurement indicative of the concentration 174 of the refrigerant and comparing the second measurement to the gas concentration threshold 172. If the concentration 174 of the refrigerant continues to exceed the gas concentration threshold 172, the decision block 510 may include returning to operation 508 to continue operating the HVAC system 100, 200 in the mitigation mode 195. If the second measurement is below the gas concentration threshold 172, the operational flow may proceed to operation 512, which includes deactivating the alarm 198.

At operation 514, the operational flow 500 includes operating the HVAC system 100, 200 in a leak diagnostic mode 186. In some embodiments, the leak diagnostic mode 186 is implemented to identify which of the one or more refrigerant circuit 201-204 includes the refrigerant leak. During the leak diagnostic mode 186, the controller 104 may turn on the compressor 106a-106d for the one or more refrigerant circuits 201-204. During the leak diagnostic mode 186, the blower 128 and the fan 110 are also turned on. Operation 516 includes operating the HVAC system 100, 200 in the leak diagnostic mode 186 for a predetermined duration 170. The predetermined duration 170 may include any amount of time, but in some embodiments ranges from about 5 minutes to 10 minutes.

At operation 518, the operational flow 500 includes acquiring a first measurement indicative of a first saturated suction temperature 166b (i) for the one or more refrigerant circuits 201-204 using one or more loss of charge sensor 146a-146d. The operational flow 500 includes performing operation 518 while the compressor 106a-106d for the one or more refrigerant circuit 201-204 is turned on. At operation 520, the operational flow 500 includes turning the compressor 106a-106d for the one or more refrigerant circuit 201-204 off for a predetermined duration 170. The predetermined duration 170 may be any amount of time, but in some embodiments ranges from about 5 minutes to 10 minutes. At operation 522, the operational flow 500 includes turning the compressor 106a-106d for the one or more refrigerant circuits 201-204 on to compress the refrigerant after the predetermined duration 170 has elapsed. At operation 524, the operational flow 500 includes acquiring at least a second saturated suction temperature 166b (ii) for the one or more refrigerant circuits 201-204 using one or more loss of charge sensor 146a-146d while the compressor 106a-106d for the one or more refrigerant circuits 201-204 is turned on.

At operation 524, the operational flow 500 includes determining a difference between the first saturated suction temperature 166b (i) measured in operation 518 and the second saturated suction temperature 166b (ii) measured in operation 524 for the one or more refrigerant circuits 201-204. In some embodiments, the absolute value of the difference is determined. As discussed above, if a refrigerant circuit 201-204 is experiencing a refrigerant leak, the saturated suction temperature 166b may deviate over time during operation. By cycling the compressor on and off for a plurality of cycles and measuring the saturated suction temperature 166b in each cycle that the compressor 106a-106d is turned on, the deviation of the saturated suction temperature 166b may be tracked and used to identify which of the refrigerant circuits 201-204 includes the refrigerant leak.

For example, at decision block 528 the operational flow 500 includes determining if the first refrigerant circuit 201 includes a refrigerant leak by comparing the difference between the first saturated suction temperature 166b (i) and the second saturated suction temperature 166b (ii) for the first refrigerant circuit 201 to a saturated suction temperature threshold value 168d. In some embodiments, the saturated suction temperature threshold value 168d is set to about 4° F. If the difference between the first saturated suction temperature 166b (i) and the second saturated suction temperature 166b (ii) for the first refrigerant circuit 201 exceeds the saturated suction temperature threshold value 168d then the controller 104 may determine that the first refrigerant circuit 201 includes a refrigerant leak and may proceed to operation 530.

At operation 530, the HVAC system 100, 200 may be operated in a pump down mode 176, where during the pump down mode 176 the controller 104 is configured to turn on the first compressor 106a and close the first controllable valve 156a in the first refrigerant circuit 201 to contain the refrigerant between the first compressor 106a and the first controllable valve 156a. In some embodiments, closing the first controllable valve 156a causes the refrigerant to vent from the first pressure relief valve 158a as the predetermined pressure threshold 180 of the first pressure relief valve 158a is exceeded. In this way, the refrigerant may be evacuated from the first refrigerant circuit 201 in the event that a refrigerant leak is detected.

Returning to decision block 528, if the difference between the first saturated suction temperature 166b (i) and the second saturated suction temperature 166b (ii) for the first refrigerant circuit 201 is below the saturated suction temperature threshold value 168d, the operational flow 500 may proceed to decision block 532. The operational flow 500 may also proceed to decision block 532 after operation 530.

At decision block 532, the operational flow 500 includes determining if the second refrigerant circuit 202 includes a refrigerant leak by comparing the difference between the first saturated suction temperature 166b (i) and the second saturated suction temperature 166b (ii) for the second refrigerant circuit 202 to the saturated suction temperature threshold value 168d. If the difference between the first saturated suction temperature 166b (i) and the second saturated suction temperature 166b (ii) for the second refrigerant circuit 202 exceeds the saturated suction temperature threshold value 168d then the controller 104 may determine that the second refrigerant circuit 202 includes a refrigerant leak and may proceed to operation 534. At operation 534, the HVAC system 100, 200 may be operated in a pump down mode 176, where during the pump down mode 176 the controller 104 is configured to turn on the second compressor 106b and close the second controllable valve 156b in the second refrigerant circuit 202 to contain the refrigerant between the second compressor 106b and the second controllable valve 156b. In some embodiments, closing the second controllable valve 156b causes the refrigerant to vent from the second pressure relief valve 158b as the predetermined pressure threshold 180 of the second pressure relief valve 158b is exceeded.

Returning to decision block 532, if the difference between the first saturated suction temperature 166b (i) and the second saturated suction temperature 166b (ii) for second refrigerant circuit 202 is below the saturated suction temperature threshold value 168d, the operational flow 500 may proceed to decision block 536. The operational flow 500 may also proceed to decision block 536 after operation 534.

At decision block 536, the operational flow 500 includes determining if the third refrigerant circuit 203 includes a refrigerant leak by comparing the difference between the first saturated suction temperature 166b (i) and the second saturated suction temperature 166b (ii) for the third refrigerant circuit 203 to the saturated suction temperature threshold value 168d. If the difference between the first saturated suction temperature 166b (i) and the second saturated suction temperature 166b (ii) for the third refrigerant circuit 203 exceeds the saturated suction temperature threshold value 168d then the controller 104 may determine that the third refrigerant circuit 203 includes a refrigerant leak and may proceed to operation 538. At operation 538, the HVAC system 100, 200 may be operated in a pump down mode 176, where during the pump down mode 176 the controller 104 is configured to turn on the third compressor 106c and close the third controllable valve 156c in the third refrigerant circuit 203 to contain the refrigerant between the third compressor 106c and the third controllable valve 156c. In some embodiments, closing the third controllable valve 156c causes the refrigerant to vent from the third pressure relief valve 158c as the predetermined pressure threshold 180 of the third pressure relief valve 158c is exceeded.

Returning to decision block 536, if the difference between the first saturated suction temperature 166b (i) and the second saturated suction temperature 166b (ii) for third refrigerant circuit 203 is below the saturated suction temperature threshold value 168d, the operational flow 500 may proceed to decision block 532. The operational flow 500 may also proceed to decision block 540 after operation 538.

At decision block 540, the operational flow 500 includes determining if the fourth refrigerant circuit 204 includes a refrigerant leak by comparing the difference between the first saturated suction temperature 166b (i) and the second saturated suction temperature 166b (ii) for the fourth refrigerant circuit 204 to the saturated suction temperature threshold value 168d. If the difference between the first saturated suction temperature 166b (i) and the second saturated suction temperature 166b (ii) for the fourth refrigerant circuit 204 exceeds the saturated suction temperature threshold value 168d then the controller 104 may determine that the fourth refrigerant circuit 204 includes a refrigerant leak and may proceed to operation 542. At operation 542, the HVAC system 100, 200 may be operated in a pump down mode 176, where during the pump down mode 176 the controller 104 is configured to turn on the fourth compressor 106d and close the fourth controllable valve 156d in the fourth refrigerant circuit 204 to contain the refrigerant between the fourth compressor 106d and the fourth controllable valve 156d. In some embodiments, closing the fourth controllable valve 156d causes the refrigerant to vent from the fourth pressure relief valve 158d as the predetermined pressure threshold 180 of the fourth pressure relief valve 158d is exceeded.

Returning to decision block 540, if the difference between the first saturated suction temperature 166b (i) and the second saturated suction temperature 166b (ii) for fourth refrigerant circuit 204 is below the saturated suction temperature threshold value 168d, the operational flow 500 may proceed to decision block 544. The operational flow 500 may also proceed to decision block 544 after operation 542.

At decision block 544, the operational flow 500 includes determining whether the controller 104 should end the leak diagnostic mode 186 and return one or more of the refrigerant circuits 201-204 to a normal mode 178 of operation (e.g., cooling mode of operation or a heating mode of operation with the compressor 106a-106d on) in operation 546. If a refrigerant leak is detected in operations 528-542, the controller 104 in decision block 544 may transition each of the one or more refrigerant circuit 201-204 that does not include a refrigerant leak to transition to a normal mode 178 of operation in operation 546. For example, if a refrigerant leak is detected in operations 528-542, the controller 104 may end the leak diagnostic mode 186 and initiate the one or more refrigerant circuit 201 that does not include to operate in the normal mode 178 of operation. If no refrigerant leak is identified in operations 528-542, decision block 544 may include returning to operation 516 for another cycle in the leak diagnostic mode 186.

Figure 6:
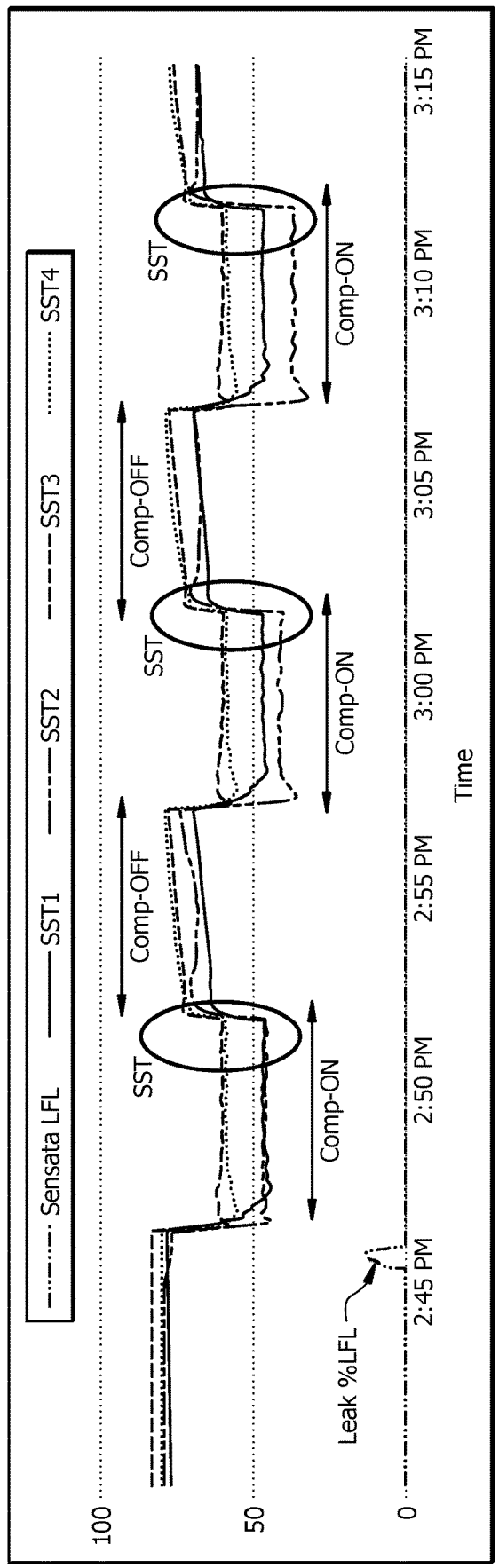
FIG. 6 is a graph illustrating an example of saturated suction temperatures (° F.) acquired over time by one or more loss of charge sensor during a leak diagnostic mode according to some embodiments of the present disclosure.

FIG. 6 is a non-limiting example illustrating a graph of saturated suction temperatures 166b acquired over time by one or more loss of charge sensor 146a-146d in refrigerant circuits 201-204. As shown in FIG. 6, the leak diagnostic mode 186 may include cycling the compressors 106a-106b on and off for a plurality of cycles. The one or more loss of charge sensor 146a-146d may acquire a respective measurement indicative of the saturated suction temperature 166b of the refrigerant for each cycle while the compressor 106a-106d of the refrigerant circuits 201-204 is turned on. In this non-limiting example, the second refrigerant circuit 202 includes a saturated suction temperature 166b that deviates over time and exceeds the saturated suction temperature threshold value 168d indicating that the refrigerant leak is in the second refrigerant circuit 202.

Method of Operation

Figure 7:
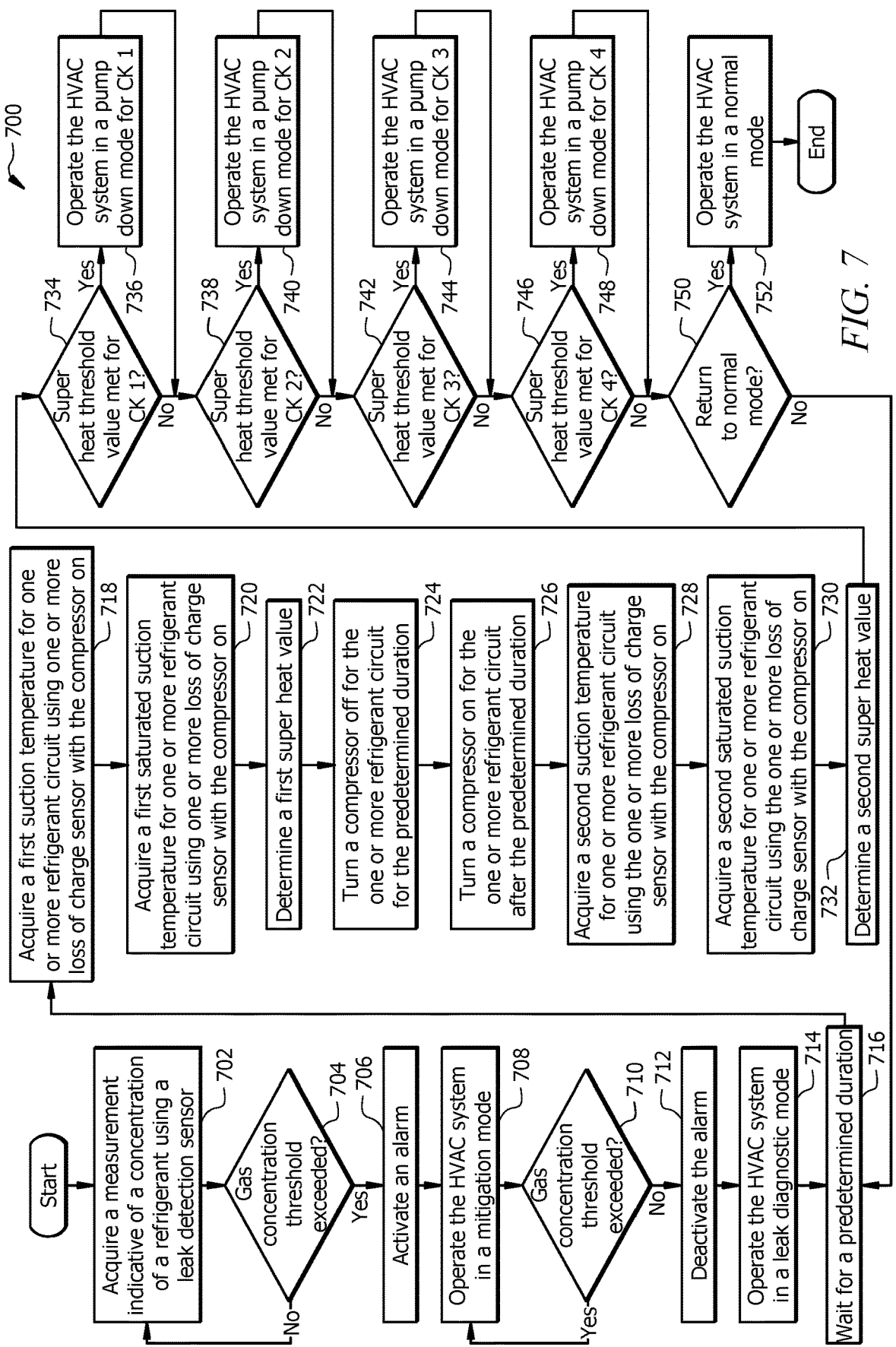
FIG. 7 is a flowchart of an example method of operating the HVAC systems of FIGS. 1-4 according to some embodiments of the present disclosure.

FIG. 7 illustrates an example operational flow 700 for operating the HVAC systems 100, 200 of FIGS. 1-4. In general, the operational flow 700 may be used to detect one or more refrigerant leak in the HVAC systems 100, 200 using one or more super heat value 166e. In some embodiments, the operational flow 700 may be used to determine if one or more refrigerant circuits 201-204 include a refrigerant leak. Once a refrigerant leak is detected, the refrigerant circuit 201-204 including the refrigerant leak may be evacuated using a pump down mode 176 of operation.

The operational flow 700 can logically be described in four parts. The first part includes operations 702-706, which generally includes acquiring a measurement indicative of a concentration 174 of refrigerant using the one or more leak detection sensors 150-154 and determining whether the concentration 174 of the refrigerant exceeds a gas concentration threshold 172. If the concentration 174 of the refrigerant exceeds the gas concentration threshold 172, the first part further includes activating the alarm 198, and proceeding to the second part of operational flow 700.

The second part includes operations 708-712, which generally includes operating the HVAC system 100, 200 in a mitigation mode 195 (e.g., compressor 106a-d off, blower 128 on, and fans 110 on) to mitigate the refrigerant leak within the HVAC system 100, 200, and determining if the concentration 174 of the refrigerant still exceeds gas concentration threshold 172 after operating the HVAC system 100, 200 in the mitigation mode 195. If the concentration 174 of the refrigerant is below the gas concentration threshold 172 after operating the HVAC system 100, 200 in the mitigation mode 195, the second part may proceed to deactivate the alarm 198 and proceed to the third part of operational flow 700.

The third part includes operations 714-732, and may start by operating the HVAC system 100, 200 in a leak diagnostic mode 186 to determine if one or more refrigerant circuits 201-204 include a refrigerant leak. The third part may include turning the compressor 106a-106d on in the leak diagnostic mode 186, and waiting for a predetermined duration 170 before acquiring a first suction temperature 166c (i) for one or more refrigerant circuit 201-204 using one or more loss of charge sensor 148a-148d, and a first saturated suction temperature 166b (i) for one or more refrigerant circuit 201-204 using one or more loss of charge sensor 146a-146d. The third part may further include determining a first super heat value 166e (i) for one or more refrigerant circuit 201-204 based at least upon a difference between the first suction temperature 166c (i) and the first saturated suction temperature 166b (i) for the one or more refrigerant circuit 201-204.

The third part may further include turning the compressor 106a-106d off for a predetermined duration 170 before acquiring a second suction temperature 166c (ii) for one or more refrigerant circuit 201-204 using one or more loss of charge sensor 148a-148d, and a second saturated suction temperature 166b (ii) for one or more refrigerant circuit 201-204 using one or more loss of charge sensor 146a-d. The third part may further include determining a second super heat value 166e (ii) for one or more refrigerant circuit 201-204 based at least upon a difference between the second suction temperature 166c (ii) and the second saturated suction temperature 166b (ii) for the one or more refrigerant circuit 201-204.

The fourth part includes operations 734-752, which generally includes determining whether a refrigerant leak is present in one or refrigerant circuit 201-204. The fourth part may include determining that a refrigerant leak is present in the one or more refrigerant circuits 201-204 if at least one of the first super heat value 168e (i) or the second super heat value 168c (ii) exceeds a super heat threshold value 168b. If at least one of the first super heat value 168c (i) or the second super heat value 168e (ii) exceeds the super heat threshold value 168b, the fourth part of operational flow 700 may further include evacuating each refrigerant circuit 201-204 exceeding the threshold using in a pump down mode 176.

At operation 702, the operational flow 700 includes acquiring a measurement indicative of a concentration 174 of the refrigerant using the one or more leak detection sensors 150-154. For example, a first leak detection sensor 150 may be positioned adjacent to the evaporator 116 or within the duct system 122. The first leak detection sensor 150 may be configured to acquire a measurement indicative of a concentration 174 of the refrigerant in the indoor unit of the HVAC system 100, 200. In some embodiments, a second leak detection sensor 152 may be positioned proximate to the condenser 108. The second leak detection sensor 152 may be configured to acquire a measurement indicative of a concentration 174 of the refrigerant in the outdoor unit of the HVAC system 100, 200. In some embodiments, a third leak detection sensor 154 may be positioned proximate to the compressor 106 or controller 104. The third leak detection sensor 154 may be configured to acquire a measurement indicative of a concentration 174 of the refrigerant in the control panel unit of the HVAC system 100, 200.

At decision block 704, the operational flow 700 includes determining whether the concentration 174 of the refrigerant exceeds a gas concentration threshold 172. In some embodiments, the controller 104 may receive a measurement from the one or more leak detection sensors 150-154 that is indicative of the concentration 174 of the refrigerant. As described in detail above, the one or more leak detection sensor 150-154 may be a thermal conductivity sensor or a speed of sound sensor. The controller 104 may receive the change in thermal conductivity and/or speed of sound of the air surrounding the one or more leak detection sensor 150-154 to determine a first concentration 174a of refrigerant. Decision block 704 may further include using the controller 104 to compare the first concentration 174a of the refrigerant to a gas concentration threshold 172. In some embodiments, the gas concentration threshold 172 is 12% of a lower flammability limit (LFL) of the refrigerant. If the concentration 174 of the refrigerant exceeds the gas concentration threshold 172, then the operational flow 700 may proceed to operation 706. At operation 706, the operational flow 700 includes activating an alarm 198. For example, the controller 104 may be configured to cause the alarm 198 to produce an audio or visual indication to alert the user that the gas concentration threshold 172 is exceeded.

At operation 708, the operational flow 700 includes operating the HVAC system 100, 200 in a mitigation mode 195. During the mitigation mode 195, the HVAC system 100, 200 may activate the blower 128 and/or the fan 110 in attempts to use airflow to mitigate the leaked refrigerant from accumulating within the HVAC system 100, 200. For example, in response to determining that the concentration 174 of the refrigerant exceeds the gas concentration threshold 172, the HVAC system 100, 200 may operate in the mitigation mode 195, which includes turning the compressor 106a-106d off, turning the blower 128 on, and optionally turning fan 110 on to mitigate the accumulation of the leaked refrigerant within the HVAC system 100, 200.

At decision block 710, the operational flow 700 includes determining whether the concentration 174 of the refrigerant continues to exceed the gas concentration threshold 172 after operating in the mitigation mode 195 for a duration. For example, decision block 710 may include using the one or more leak detection sensors 150-154 to acquire a second measurement indicative of the concentration 174 of the refrigerant and comparing the second measurement to the gas concentration threshold 172. If the concentration 174 of the refrigerant continues to exceed the gas concentration threshold 172, the decision block 710 may include returning to operation 708 to continue operating the HVAC system 100, 200 in the mitigation mode 195. If the second measurement is below the gas concentration threshold 172, the operational flow 700 may proceed to operation 712, which includes deactivating the alarm 198.

At operation 714, the operational flow 700 includes operating the HVAC system 100, 200 in a leak diagnostic mode 186. In some embodiments, the leak diagnostic mode 186 is implemented to identify which of the one or more refrigerant circuit 201-204 includes the refrigerant leak. During the leak diagnostic mode 186, the controller 104 may turn on the compressor 106a-106d for the one or more refrigerant circuits 201-204. During the leak diagnostic mode 186, the blower 128 and the fan 110 are also turned on. Operation 716 includes operating the HVAC system 100, 200 in the leak diagnostic mode 186 for a predetermined duration 170. The predetermined duration 170 may include any amount of time, but in some embodiments ranges from about 5 minutes to 10 minutes.

At operation 718, the operational flow 700 includes acquiring a measurement indicative of a first suction temperature 166c (i) for the one or more refrigerant circuits 201-204 using one or more loss of charge sensor 148a-148d. At operation 720, the operational flow 700 includes acquiring a measurement indicative of a first saturated suction temperature 166b (i) for the one or more refrigerant circuits 201-204 using one or more loss of charge sensor 146a-146d. The operational flow 700 includes performing operations 718 and 720 while the compressor 106a-106d for the one or more refrigerant circuit 201-204 is turned on. At operation 722, the operational flow 700 includes determining a first super heat value 166e (i) for the one or more refrigerant circuit 201-204 based at least upon a difference between the first suction temperature 166c (i) and the first saturated suction temperature 166b (i) for the one or more refrigerant circuits 201-204.

At operation 724, the operational flow 700 includes turning the compressor 106a-106d for the one or more refrigerant circuit 201-204 off for a predetermined duration 170. The predetermined duration 170 may be any amount of time, but in some embodiments ranges from about 5 minutes to 10 minutes. At operation 726, the operational flow 700 includes turning the compressor 106a-106d for the one or more refrigerant circuits 201-204 on to compress the refrigerant after the predetermined duration 170 has elapsed.

At operation 728, the operational flow 700 includes acquiring a measurement indicative of a second suction temperature 166c (ii) for the one or more refrigerant circuits 201-204 using one or more loss of charge sensor 148a-148d. At operation 730, the operational flow 700 includes acquiring a measurement indicative of a second saturated suction temperature 166b (ii) for the one or more refrigerant circuits 201-204 using one or more loss of charge sensor 146a-146d. The operational flow 700 includes performing operations 728 and 730 while the compressor 106a-106d for the one or more refrigerant circuit 201-204 is turned on. At operation 732, the operational flow 700 includes determining a second super heat value 166e (ii) for the one or more refrigerant circuit 201-204 based at least upon a difference between the second suction temperature 166c (ii) and the second saturated suction temperature 166b (ii) for the one or more refrigerant circuits 201-204. As discussed above, if a refrigerant circuit 201-204 is experiencing a refrigerant leak, the super heat value 166e may deviate over time during operation. By cycling the compressor 106a-106d on and off for a plurality of cycles and determining the super heat value 166e in each cycle that the compressor 106a-106d is turned on, the deviation of the super heat value 166e may be tracked over time and used to identify which of the refrigerant circuits 201-204 includes the refrigerant leak.

For example, at decision block 734, the operational flow 700 includes determining if the first refrigerant circuit 201 includes a refrigerant leak by comparing the first super heat value 166e (i) determined in operation 722 and the second super heat value 166e (ii) determined in operation 732 for the first refrigerant circuit 201 to a super heat threshold value 168b. In some embodiments, the super heat threshold value 168b is set to about 20° F. The controller 104 may determine that the first refrigerant circuit 201 includes the refrigerant leak if at least one of the first super heat value 166e (i) determined in operation 722 or the second super heat value 166c (ii) determined in operation 732 for the first refrigerant circuit 201 exceeds the super heat threshold value 168b. If the super heat threshold value 168b is exceeded for the first refrigerant circuit 201, the operational flow 700 may proceed to operation 736.

At operation 736, the HVAC system 100, 200 may be operated in a pump down mode 176, where during the pump down mode 176 the controller 104 is configured to turn on the first compressor 106a and close the first controllable valve 156a in the first refrigerant circuit 201 to contain the refrigerant between the first compressor 106a and the first controllable valve 156a. In some embodiments, closing the first controllable valve 156a causes the refrigerant to vent from the first pressure relief valve 158a as the predetermined pressure threshold 180 of the first pressure relief valve 158a is exceeded. In this way, the refrigerant may be evacuated from the first refrigerant circuit 201 in the event that a refrigerant leak is detected.

Returning to decision block 738, if both the first super heat value 166e (i) determined in operation 722 and the second super heat value 166e (ii) determined in operation 732 are below the super heat threshold value 168b, the operational flow 700 proceeds to decision block 738. The operational flow 700 may also proceed to decision block 738 after operation 736.

At decision block 738, the operational flow 700 includes determining if the second refrigerant circuit 202 includes a refrigerant leak by comparing the first super heat value 166e (i) determined in operation 722 and the second super heat value 166c (ii) determined in operation 732 for the second refrigerant circuit 202 to a super heat threshold value 168b. The controller 104 may determine that the second refrigerant circuit 202 includes the refrigerant leak if at least one of the first super heat value 166e (i) determined in operation 722 or the second super heat value 166e (ii) determined in operation 732 for the second refrigerant circuit 202 exceeds the super heat threshold value 168b. If the super heat threshold value 168b is exceeded for the second refrigerant circuit 202, the operational flow 700 may proceed to operation 736.

At operation 736, the HVAC system 100, 200 may be operated in a pump down mode 176, where during the pump down mode 176 the controller 104 is configured to turn on the second compressor 106b and close the second controllable valve 156b in the second refrigerant circuit 202 to contain the refrigerant between the second compressor 106b and the second controllable valve 156b. In some embodiments, closing the second controllable valve 156b causes the refrigerant to vent from the second pressure relief valve 158b as the predetermined pressure threshold 180 of the second pressure relief valve 158b is exceeded. In this way, the refrigerant may be evacuated from the second refrigerant circuit 202 in the event that a refrigerant leak is detected.

Returning to decision block 738, if both the first super heat value 166e (i) determined in operation 722 and the second super heat value 166e (ii) determined in operation 732 for the second refrigerant circuit 202 are below the super heat threshold value 168b, the operational flow 700 proceeds to decision block 742. The operational flow 700 may also proceed to decision block 742 after operation 740.

At decision block 742, the operational flow 700 includes determining if the third refrigerant circuit 203 includes a refrigerant leak by comparing the first super heat value 166e (i) determined in operation 722 and the second super heat value 166c (ii) determined in operation 732 for the third refrigerant circuit 203 to the super heat threshold value 168b. The controller 104 may determine that the third refrigerant circuit 203 includes the refrigerant leak if at least one of the first super heat value 166e (i) determined in operation 722 or the second super heat value 166e (ii)

determined in operation 732 for the third refrigerant circuit 203 exceeds the super heat threshold value 168b. If the super heat threshold value 168b is exceeded for the third refrigerant circuit 203, the operational flow 700 may proceed to operation 744.

At operation 744, the HVAC system 100, 200 may be operated in a pump down mode 176, where during the pump down mode 176 the controller 104 is configured to turn on the third compressor 106c and close the third controllable valve 156c in the third refrigerant circuit 203 to contain the refrigerant between the third compressor 106c and the third controllable valve 156c. In some embodiments, closing the third controllable valve 156c causes the refrigerant to vent from the third pressure relief valve 158c as the predetermined pressure threshold 180 of the third pressure relief valve 158c is exceeded. In this way, the refrigerant may be evacuated from the third refrigerant circuit 203 in the event that a refrigerant leak is detected.

Returning to decision block 742, if both the first super heat value 166e (i) determined in operation 722 and the second super heat value 166e (ii) determined in operation 732 for the third refrigerant circuit 203 are below the super heat threshold value 168b, the operational flow 700 proceeds to decision block 746. The operational flow 700 may also proceed to decision block 746 after operation 744.

At decision block 746, the operational flow 700 includes determining if the fourth refrigerant circuit 204 includes a refrigerant leak by comparing the first super heat value 166e (i) determined in operation 722 and the second super heat value 166e (ii) determined in operation 732 for the fourth refrigerant circuit 204 to the super heat threshold value 168b. The controller 104 may determine that the fourth refrigerant circuit 204 includes the refrigerant leak if at least one of the first super heat value 166e (i) determined in operation 722 or the second super heat value 166e (ii) determined in operation 732 for the fourth refrigerant circuit 204 exceeds the super heat threshold value 168b. If the super heat threshold value 168b is exceeded for the fourth refrigerant circuit 204, the operational flow 700 may proceed to operation 748.

At operation 748, the HVAC system 100, 200 may be operated in a pump down mode 176, where during the pump down mode 176 the controller 104 is configured to turn on the fourth compressor 106d and close the fourth controllable valve 156d in the fourth refrigerant circuit 204 to contain the refrigerant between the fourth compressor 106d and the fourth controllable valve 156d. In some embodiments, closing the fourth controllable valve 156d causes the refrigerant to vent from the fourth pressure relief valve 158d as the predetermined pressure threshold 180 of the fourth pressure relief valve 158d is exceeded. In this way, the refrigerant may be evacuated from the fourth refrigerant circuit 204 in the event that a refrigerant leak is detected.

Returning to decision block 746, if both the first super heat value 166e (i) determined in operation 722 and the second super heat value 166c (ii) determined in operation 732 for the fourth refrigerant circuit 204 are below the super heat threshold value 168b, the operational flow 700 proceeds to decision block 750. The operational flow 700 may also proceed to decision block 750 after operation 748.

At decision block 750, the operational flow 700 includes determining whether the controller 104 should end the leak diagnostic mode 186 and return one or more of the refrigerant circuits 201-204 to a normal mode 178 of operation (e.g., cooling mode of operation or a heating mode of operation with the compressor 106a-106d on) in operation 752. If a refrigerant leak is detected in operations 734-748, the controller 104 in decision block 750 may transition each of the one or more refrigerant circuit 201-204 that does not include a refrigerant leak to a normal mode 178 of operation in operation 752. For example, if a refrigerant leak is detected in operations 734-748, the controller 104 may end the leak diagnostic mode 186 and initiate the one or more refrigerant circuit 201 that does not include to operate in the normal mode 178 of operation. If no refrigerant leak is identified in operations 734-748, decision block 750 may include returning to operation 716 for another cycle in the leak diagnostic mode 186.

Figure 8:
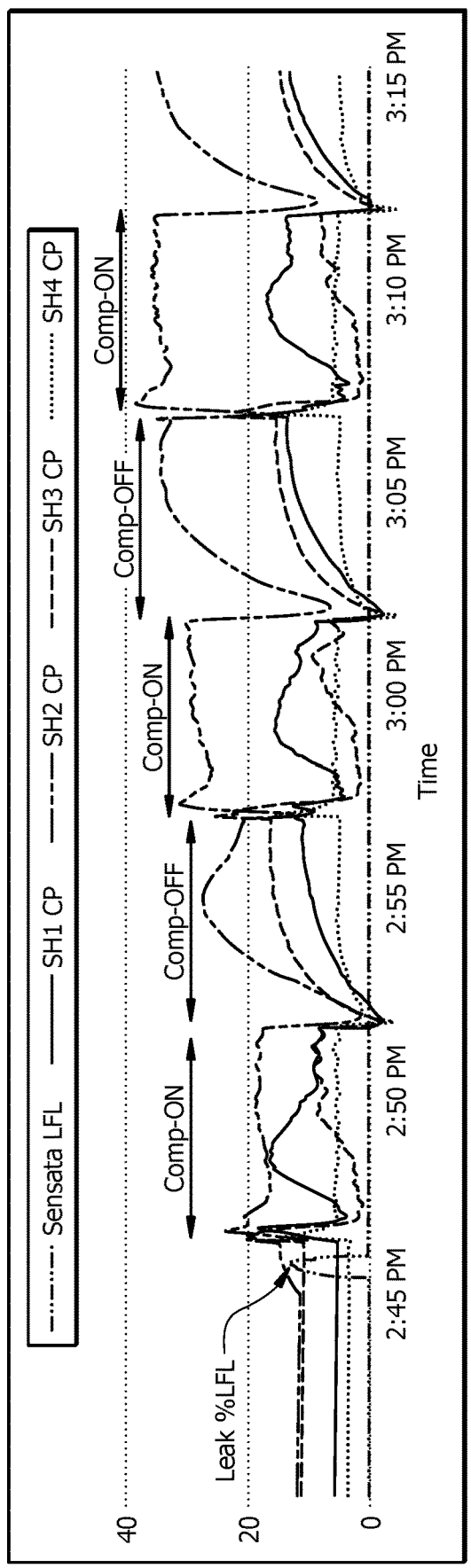
FIG. 8 is a graph illustrating an example of super heat values (° F.) acquired over time by loss of charge sensors during a leak diagnostic mode according to some embodiments of the present disclosure.

FIG. 8 is a non-limiting example illustrating a graph of super heat values 166e that were determined by the controller 104 for one or more refrigerant circuits 201-204. As shown in FIG. 8, the leak diagnostic mode 186 may include cycling the compressors 106a-106b on and off for a plurality of cycles. The controller 104 may determine a super heat value 166e for each cycle while the compressor 106a-106d of the refrigerant circuits 201-204 is turned on. In this non-limiting example, the second refrigerant circuit 202 includes a super heat value 166e that deviates over time and exceeds the super heat threshold value 168b indicating that the refrigerant leak is in the second refrigerant circuit 202.

Method of Operation

Figure 9:
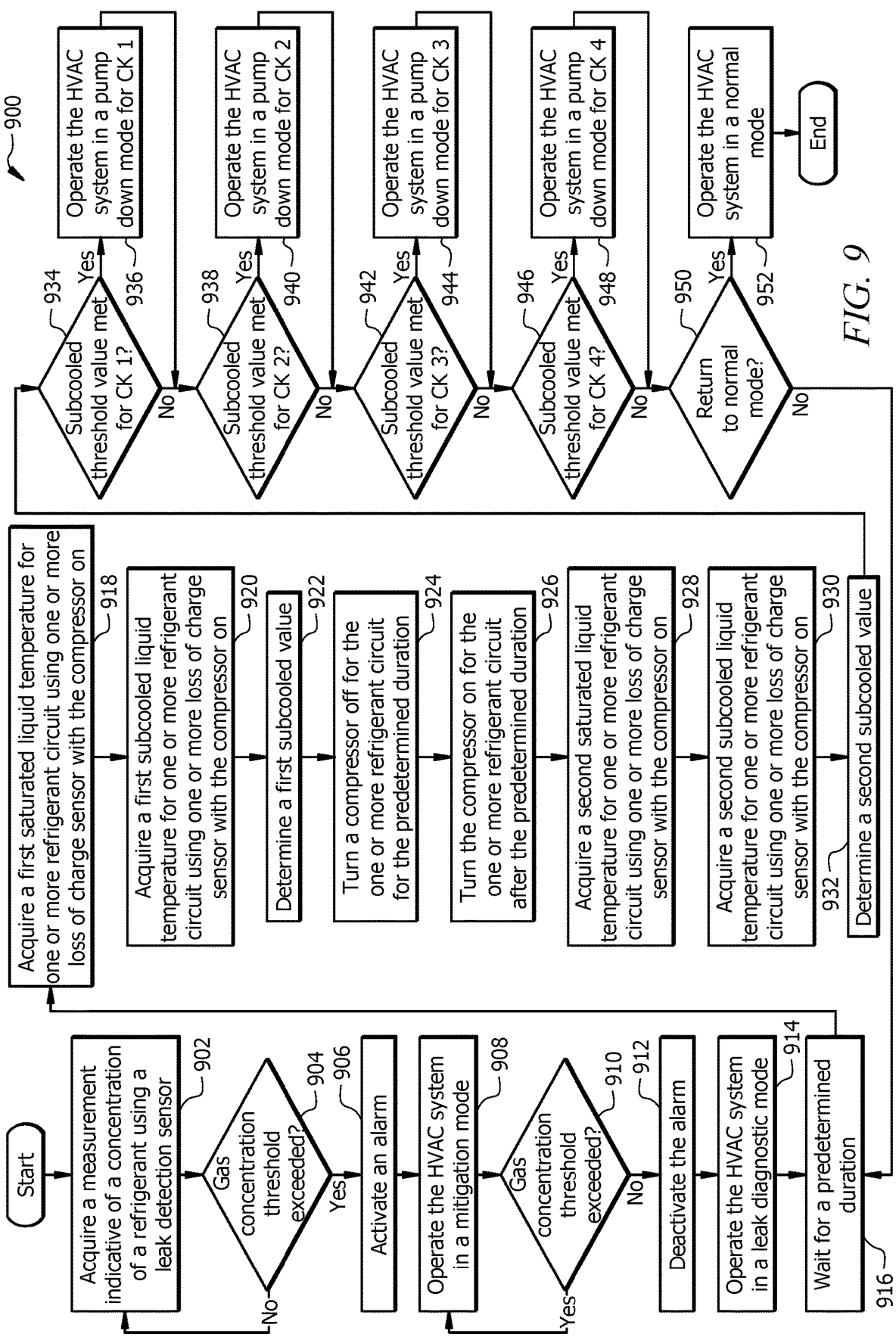
FIG. 9 is a flowchart of an example method of operating the HVAC systems of FIGS. 1-4 according to some embodiments of the present disclosure.

FIG. 9 illustrates an example operational flow 900 for operating the HVAC systems 100, 200 of FIGS. 1-4. In general, the operational flow 900 may be used to detect one or more refrigerant leak in the HVAC systems 100, 200 using one or more subcooled value 166f. In some embodiments, the operational flow 900 may be used to determine if one or more refrigerant circuits 201-204 include a refrigerant leak. Once a refrigerant leak is detected, the refrigerant circuit 201-204 including the refrigerant leak may be evacuated using a pump down mode 176 of operation.

The operational flow 900 can logically be described in four parts. The first part includes operations 902-906, which generally includes acquiring a measurement indicative of a concentration 174 of refrigerant using the one or more leak detection sensors 150-154 and determining whether the concentration 174 of the refrigerant exceeds a gas concentration threshold 172. If the concentration 174 of the refrigerant exceeds the gas concentration threshold 172, the first part further includes activating the alarm 198, and proceeding to the second part of operational flow 900.

The second part includes operations 908-912, which generally includes operating the HVAC system 100, 200 in a mitigation mode 195 (e.g., compressor 106a-d off, blower 128 on, and fans 110 on) to mitigate the refrigerant leak within the HVAC system 100, 200, and determining if the concentration 174 of the refrigerant still exceeds gas concentration threshold 172 after operating the HVAC system 100, 200 in the mitigation mode 195. If the concentration 174 of the refrigerant is below the gas concentration threshold 172 after operating the HVAC system 100, 200 in the mitigation mode 195, the second part may proceed to deactivate the alarm 198 and proceed to the third part of operational flow 900.

The third part includes operations 914-932, and may start by operating the HVAC system 100, 200 in a leak diagnostic mode 186 to determine if one or more refrigerant circuits 201-204 include a refrigerant leak. The third part may include turning the compressor 106a-106d on in the leak diagnostic mode 186, and waiting for a predetermined duration 170 before acquiring a first saturated liquid temperature 166a (i) for one or more refrigerant circuit 201-204 using one or more loss of charge sensor 142a-142d and a first subcooled liquid temperature 166d (i) for one or more refrigerant circuit 201-204 using one or more loss of charge sensor 144a-144d. The third part may further include determining a first subcooled value 166f (i) for one or more refrigerant circuit 201-204 based at least upon a difference between the first subcooled liquid temperature 166d (i) and the first saturated liquid temperature 166a (i) for the one or more refrigerant circuit 201-204.

The third part may further include turning the compressor 106a-106d off for a predetermined duration 170 before acquiring a second saturated liquid temperature 166a (ii) for one or more refrigerant circuit 201-204 using one or more loss of charge sensor 142a-142d, and a second subcooled liquid temperature 166d (ii) for one or more refrigerant circuit 201-204 using one or more loss of charge sensor 144a-144d. The third part may further include determining a second subcooled value 166f (ii) for one or more refrigerant circuit 201-204 based at least upon a difference between the second subcooled liquid temperature 166d (ii) and the second saturated liquid temperature 166a (ii) for the one or more refrigerant circuit 201-204.

The fourth part includes operations 934-952, which generally includes determining whether a refrigerant leak is present in one or refrigerant circuit 201-204. The fourth part may include determining that a refrigerant leak is present in the one or more refrigerant circuits 201-204 if at least one of the first subcooled value 166f (i) or the second subcooled value 166f (ii) exceeds a subcooled threshold value 168c. If at least one of the first subcooled value 166f (i) or the second subcooled value 166f (ii) exceeds the subcooled threshold value 168c, the fourth part of operational flow 900 may further include evacuating each refrigerant circuit 201-204 exceeding the threshold using in a pump down mode 176.

At operation 902, the operational flow 900 includes acquiring a measurement indicative of a concentration 174 of the refrigerant using the one or more leak detection sensors 150-154. For example, a first leak detection sensor 150 may be positioned adjacent to the evaporator 116 or within the duct system 122. The first leak detection sensor 150 may be configured to acquire a measurement indicative of a concentration 174 of the refrigerant in the indoor unit of the HVAC system 100, 200. In some embodiments, a second leak detection sensor 152 may be positioned proximate to the condenser 108. The second leak detection sensor 152 may be configured to acquire a measurement indicative of a concentration 174 of the refrigerant in the outdoor unit of the HVAC system 100, 200. In some embodiments, a third leak detection sensor 154 may be positioned proximate to the compressor 106 or controller 104. The third leak detection sensor 154 may be configured to acquire a measurement indicative of a concentration 174 of the refrigerant in the control panel unit of the HVAC system 100, 200.

At decision block 904, the operational flow 900 includes determining whether the concentration 174 of the refrigerant exceeds a gas concentration threshold 172. In some embodiments, the controller 104 may receive a measurement from the one or more leak detection sensors 150-154 that is indicative of the concentration 174 of the refrigerant. As described in detail above, the one or more leak detection sensor 150-154 may be a thermal conductivity sensor or a speed of sound sensor. The controller 104 may receive the change in thermal conductivity and/or speed of sound of the air surrounding the one or more leak detection sensor 150-154 to determine a first concentration 174a of refrigerant. Decision block 904 may further include using the controller 104 to compare the first concentration 174a of the refrigerant to a gas concentration threshold 172. In some embodiments, the gas concentration threshold 172 is 12% of a lower flammability limit (LFL) of the refrigerant. If the concentration 174 of the refrigerant exceeds the gas concentration threshold 172, then the operational flow 900 may proceed to operation 906. At operation 906, the operational flow 900 includes activating an alarm 198. For example, the controller 104 may be configured to cause the alarm 198 to produce an audio or visual indication to alert the user that the gas concentration threshold 172 is exceeded.

At operation 908, the operational flow 900 includes operating the HVAC system 100, 200 in a mitigation mode 195. During the mitigation mode 195, the HVAC system 100, 200 may activate the blower 128 and/or the fan 110 in attempts to use airflow to mitigate the leaked refrigerant from accumulating within the HVAC system 100, 200. For example, in response to determining that the concentration 174 of the refrigerant exceeds the gas concentration threshold 172, the HVAC system 100, 200 may operate in the mitigation mode 195, which includes turning the compressor 106a-106d off, turning the blower 128 on, and optionally turning fan 110 on to mitigate the accumulation of the leaked refrigerant within the HVAC system 100, 200.

At decision block 910, the operational flow 900 includes determining whether the concentration 174 of the refrigerant continues to exceed the gas concentration threshold 172 after operating in the mitigation mode 195 for a duration. For example, decision block 710 may include using the one or more leak detection sensors 150-154 to acquire a second measurement indicative of the concentration 174 of the refrigerant and comparing the second measurement to the gas concentration threshold 172. If the concentration 174 of the refrigerant continues to exceed the gas concentration threshold 172, the decision block 910 may include returning to operation 908 to continue operating the HVAC system 100, 200 in the mitigation mode 195. If the second measurement is below the gas concentration threshold 172, the operational flow 900 may proceed to operation 912, which includes deactivating the alarm 198.

At operation 914, the operational flow 900 includes operating the HVAC system 100, 200 in a leak diagnostic mode 186. In some embodiments, the leak diagnostic mode 186 is implemented to identify which of the one or more refrigerant circuit 201-204 includes the refrigerant leak. During the leak diagnostic mode 186, the controller 104 may turn on the compressor 106a-106d for the one or more refrigerant circuits 201-204. During the leak diagnostic mode 186, the blower 128 and the fan 110 are also turned on. Operation 916 includes operating the HVAC system 100, 200 in the leak diagnostic mode 186 for a predetermined duration 170. The predetermined duration 170 may include any amount of time, but in some embodiments ranges from about 5 minutes to 10 minutes.

At operation 918, the operational flow 900 includes acquiring a measurement indicative of a first saturated liquid temperature 166a (i) for the one or more refrigerant circuits 201-204 using one or more loss of charge sensor 142a-142d. At operation 920, the operational flow 900 includes acquiring a measurement indicative of a first subcooled liquid temperature 166d (i) for the one or more refrigerant circuits 201-204 using one or more loss of charge sensor 144a-144d. The operational flow 900 includes performing operations 918 and 920 while the compressor 106a-106d for the one or more refrigerant circuit 201-204 is turned on. At operation 922, the operational flow 900 includes determining a first subcooled value 166f (i) for the one or more refrigerant circuit 201-204 based at least upon a difference between the first subcooled liquid temperature 166d (i) and the first saturated liquid temperature 166a (i) for the one or more refrigerant circuits 201-204.

At operation 924, the operational flow 900 includes turning the compressor 106a-106d for the one or more refrigerant circuit 201-204 off for a predetermined duration 170. The predetermined duration 170 may be any amount of time, but in some embodiments ranges from about 5 minutes to 10 minutes. At operation 926, the operational flow 900 includes turning the compressor 106a-106d for the one or more refrigerant circuits 201-204 on to compress the refrigerant after the predetermined duration 170 has elapsed.

At operation 928, the operational flow 900 includes acquiring a measurement indicative of a second saturated liquid temperature 166a (ii) for the one or more refrigerant circuits 201-204 using one or more loss of charge sensor 142a-142d. At operation 930, the operational flow 900 includes acquiring a measurement indicative of a second subcooled liquid temperature 166d (ii) for the one or more refrigerant circuits 201-204 using one or more loss of charge sensor 144a-144d. The operational flow 900 includes performing operations 928 and 930 while the compressor 106a-106d for the one or more refrigerant circuit 201-204 is turned on. At operation 932, the operational flow 900 includes determining a second subcooled value 166f (ii) for the one or more refrigerant circuit 201-204 based at least upon a difference between the second subcooled liquid temperature 166d (ii) and the second saturated liquid temperature 166a (ii) for the one or more refrigerant circuits 201-204. As discussed above, if a refrigerant circuit 201-204 is experiencing a refrigerant leak, the subcooled value 166f may deviate over time during operation. By cycling the compressor 106a-106d on and off for a plurality of cycles and determining the subcooled value 166f in each cycle that the compressor 106a-106d is turned on, the deviation of the subcooled value 166f may be tracked over time and used to identify which of the refrigerant circuits 201-204 includes the refrigerant leak.

For example, at decision block 934, the operational flow 900 includes determining if the first refrigerant circuit 201 includes a refrigerant leak by comparing the first subcooled value 166f (i) determined in operation 922 and the second subcooled value 166f (ii) determined in operation 932 for the first refrigerant circuit 201 to a subcooled threshold value 168c. In some embodiments, the subcooled threshold value 168c is set to about 2° F. The controller 104 may determine that the first refrigerant circuit 201 includes the refrigerant leak if at least one of the first subcooled value 166f (i) determined in operation 922 or the second subcooled value 166f (ii) determined in operation 932 for the first refrigerant circuit 201 are below the subcooled threshold value 168c. If the measurements are below the threshold, the operational flow 900 may proceed to operation 936.

At operation 936, the HVAC system 100, 200 may be operated in a pump down mode 176, where during the pump down mode 176 the controller 104 is configured to turn on the first compressor 106a and close the first controllable valve 156a in the first refrigerant circuit 201 to contain the refrigerant between the first compressor 106a and the first controllable valve 156a. In some embodiments, closing the first controllable valve 156a causes the refrigerant to vent from the first pressure relief valve 158a as the predetermined pressure threshold 180 of the first pressure relief valve 158a is exceeded. In this way, the refrigerant may be evacuated from the first refrigerant circuit 201 in the event that a refrigerant leak is detected.

Returning to decision block 938, if both the first subcooled value 166f (i) determined in operation 922 and the second subcooled value 166f (ii) determined in operation 932 are above the subcooled threshold value 168c, the operational flow 900 proceeds to decision block 938. The operational flow 900 may also proceed to decision block 938 after operation 936.

At decision block 938, the operational flow 900 includes determining if the second refrigerant circuit 202 includes a refrigerant leak by comparing the first subcooled value 166f (i) determined in operation 922 and the second subcooled value 166f (ii) determined in operation 932 for the second refrigerant circuit 202 to the subcooled threshold value 168c. The controller 104 may determine that the second refrigerant circuit 202 includes the refrigerant leak if at least one of the first subcooled value 166f (i) determined in operation 922 or the second subcooled value 166f (ii) determined in operation 932 for the second refrigerant circuit 202 are below the subcooled threshold value 168c. If the measurements are below the threshold, the operational flow 900 may proceed to operation 936.

At operation 936, the HVAC system 100, 200 may be operated in a pump down mode 176, where during the pump down mode 176 the controller 104 is configured to turn on the second compressor 106b and close the second controllable valve 156b in the second refrigerant circuit 202 to contain the refrigerant between the second compressor 106b and the second controllable valve 156b. In some embodiments, closing the second controllable valve 156b causes the refrigerant to vent from the second pressure relief valve 158b as the predetermined pressure threshold 180 of the second pressure relief valve 158b is exceeded. In this way, the refrigerant may be evacuated from the second refrigerant circuit 202 in the event that a refrigerant leak is detected.

Returning to decision block 938, if both the first subcooled value 166f (i) determined in operation 922 and the second subcooled value 166f (ii) determined in operation 932 for the second refrigerant circuit 202 are above the subcooled threshold value 168c, the operational flow 900 proceeds to decision block 942. The operational flow 900 may also proceed to decision block 942 after operation 940.

At decision block 942, the operational flow 900 includes determining if the third refrigerant circuit 203 includes a refrigerant leak by comparing the first subcooled value 166f (i) determined in operation 922 and the second subcooled value 166f (ii) determined in operation 932 for the third refrigerant circuit 203 to the subcooled threshold value 168c. The controller 104 may determine that the third refrigerant circuit 203 includes the refrigerant leak if at least one of the first subcooled value 166f (i) determined in operation 922 or the second subcooled value 166f (ii) determined in operation 932 for the third refrigerant circuit 203 are below the subcooled threshold value 168c. If the measurements are below the threshold, the operational flow 900 may proceed to operation 944.

At operation 944, the HVAC system 100, 200 may be operated in a pump down mode 176, where during the pump down mode 176 the controller 104 is configured to turn on the third compressor 106c and close the third controllable valve 156c in the third refrigerant circuit 203 to contain the refrigerant between the third compressor 106c and the third controllable valve 156c. In some embodiments, closing the third controllable valve 156c causes the refrigerant to vent from the third pressure relief valve 158c as the predetermined pressure threshold 180 of the third pressure relief valve 158c is exceeded. In this way, the refrigerant may be evacuated from the third refrigerant circuit 203 in the event that a refrigerant leak is detected.

Returning to decision block 942, if both the first subcooled value 166f (i) determined in operation 922 and the second subcooled value 166f (ii) determined in operation 932 for the third refrigerant circuit 203 are above the subcooled threshold value 168c, the operational flow 900 proceeds to decision block 946. The operational flow 900 may also proceed to decision block 946 after operation 940.

At decision block 946, the operational flow 900 includes determining if the fourth refrigerant circuit 204 includes a refrigerant leak by comparing the first subcooled value 166f (i) determined in operation 922 and the second subcooled value 166f (ii) determined in operation 932 for the fourth refrigerant circuit 204 to the subcooled threshold value 168c. The controller 104 may determine that the fourth refrigerant circuit 204 includes the refrigerant leak if at least one of the first subcooled value 166f (i) determined in operation 922 or the second subcooled value 166f (ii) determined in operation 932 for the fourth refrigerant circuit 204 are below the subcooled threshold value 168c. If the measurements are below the threshold, the operational flow 900 may proceed to operation 948.

At operation 948, the HVAC system 100, 200 may be operated in a pump down mode 176, where during the pump down mode 176 the controller 104 is configured to turn on the fourth compressor 106d and close the fourth controllable valve 156d in the fourth refrigerant circuit 204 to contain the refrigerant between the fourth compressor 106d and the fourth controllable valve 156d. In some embodiments, closing the fourth controllable valve 156d causes the refrigerant to vent from the fourth pressure relief valve 158d as the predetermined pressure threshold 180 of the fourth pressure relief valve 158d is exceeded. In this way, the refrigerant may be evacuated from the fourth refrigerant circuit 204 in the event that a refrigerant leak is detected.

Returning to decision block 946, if both the first subcooled value 166f (i) determined in operation 922 and the second subcooled value 166f (ii) determined in operation 932 for the fourth refrigerant circuit 204 are above the subcooled threshold value 168c, the operational flow 900 proceeds to decision block 950. The operational flow 900 may also proceed to decision block 950 after operation 948.

At decision block 950, the operational flow 900 includes determining whether the controller 104 should end the leak diagnostic mode 186 and return one or more of the refrigerant circuits 201-204 to a normal mode 178 of operation (e.g., cooling mode of operation or a heating mode of operation with the compressor 106a-106d on) in operation 952. If a refrigerant leak is detected in operations 934-948, the controller 104 in decision block 950 may transition each of the one or more refrigerant circuit 201-204 that does not include a refrigerant leak to a normal mode 178 of operation in operation 952. For example, if a refrigerant leak is detected in operations 934-948, the controller 104 may end the leak diagnostic mode 186 and initiate the one or more refrigerant circuit 201-204 that does not include a refrigerant leak to operate in the normal mode 178 of operation. If no refrigerant leak is identified in operations 934-948, decision block 950 may include the operation of returning the operational flow 900 to operation 916 for another cycle in the leak diagnostic mode 186.

Figure 10:
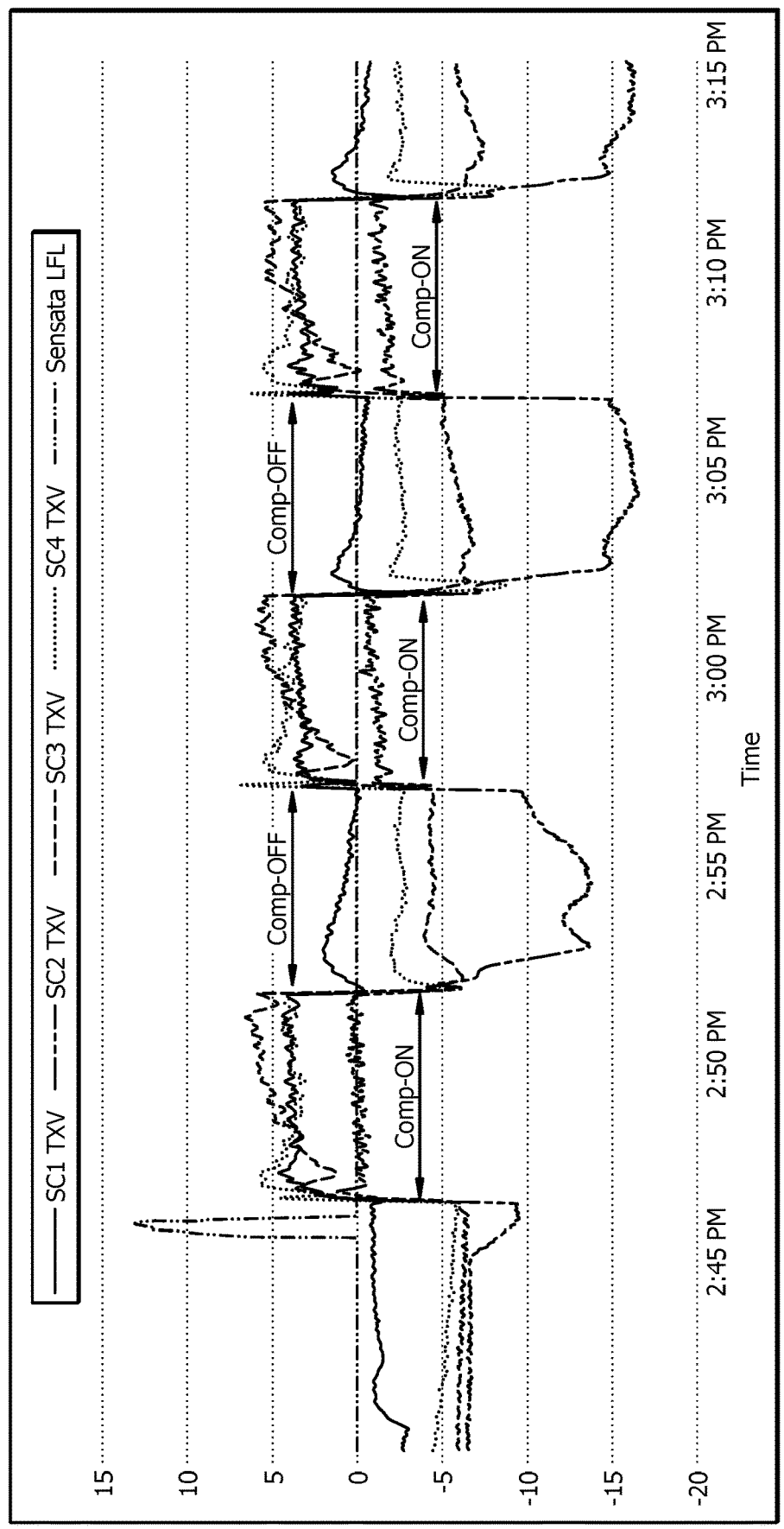
FIG. 10 is a graph illustrating an example of subcooled temperatures (° F.) acquired over time by loss of charge sensors during a leak diagnostic mode according to some embodiments of the present disclosure.

FIG. 10 is a non-limiting example illustrating a graph of subcooled values 166f that were determined by the controller 104 for one or more refrigerant circuits 201-204. As shown in FIG. 10, the leak diagnostic mode 186 may include cycling the compressors 106a-106b on and off for a plurality of cycles. The controller 104 may determine a subcooled value 166f for each cycle while the compressor 106a-106d of the refrigerant circuits 201-204 is turned on. In this non-limiting example, the second refrigerant circuit 202 includes a subcooled value 166f that deviates over time and falls below the subcooled threshold value 168c indicating that the refrigerant leak is in the second refrigerant circuit 202.

Method of Operation

Figure 11:
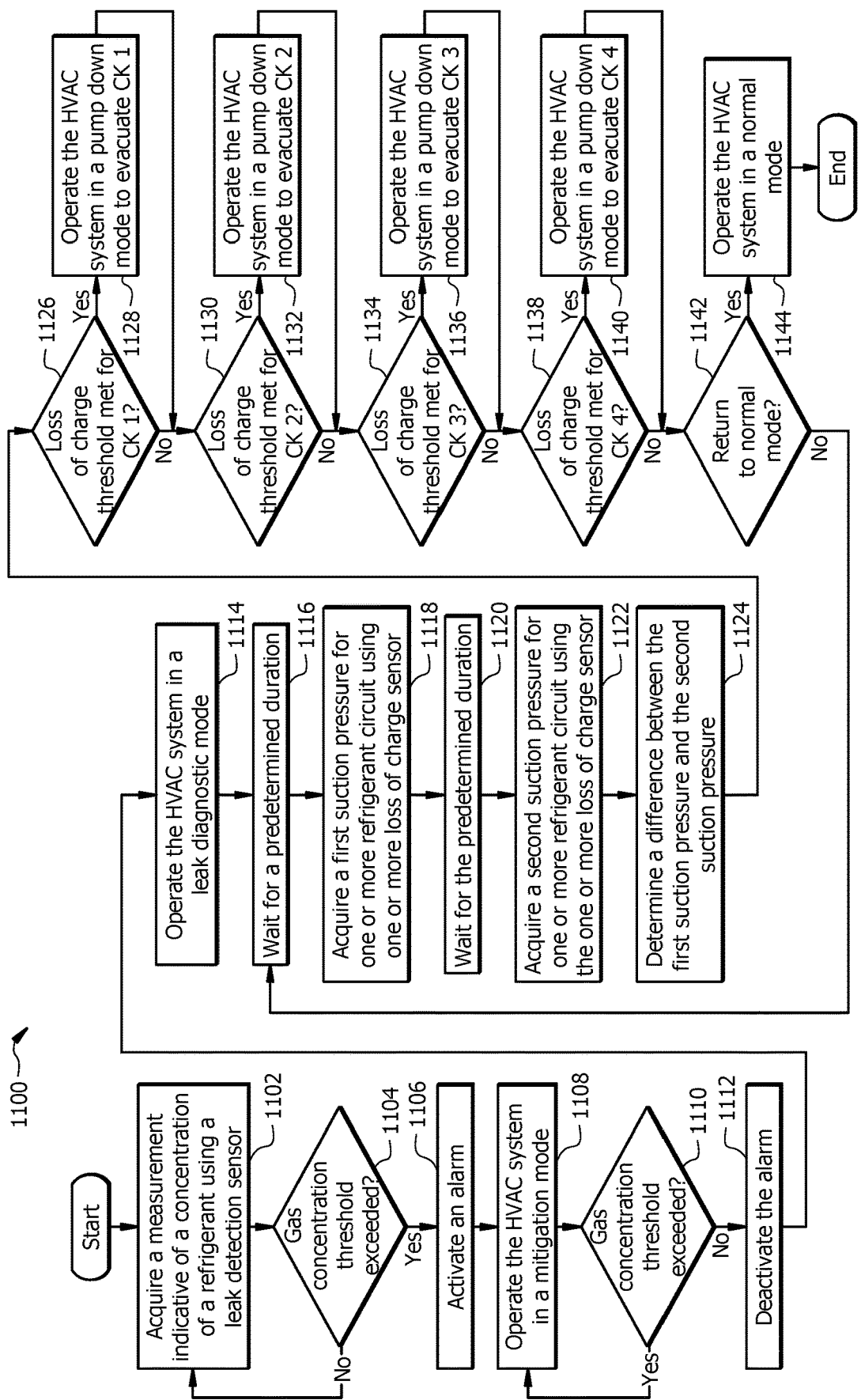
FIG. 11 is a flowchart of an example method of operating the HVAC systems of FIGS. 1-4 according to some embodiments of the present disclosure.

FIG. 11 illustrates an example operational flow 1100 for operating the HVAC systems 100, 200 of FIGS. 1-4. In general, the operational flow 1100 may be used to detect one or more refrigerant leak in the HVAC systems 100, 200 using suction pressures 166g. In some embodiments, the operational flow 700 may be used to determine if one or more refrigerant circuits 201-204 include a refrigerant leak. Once a refrigerant leak is detected, the refrigerant circuit 201-204 including the refrigerant leak may be evacuated using a pump down mode 176 of operation.

The operational flow 1100 can logically be described in four parts. The first part includes operations 1102-1106, which generally includes acquiring a measurement indicative of a concentration 174 of refrigerant using the one or more leak detection sensors 150-154 and determining whether the concentration 174 of the refrigerant exceeds a gas concentration threshold 172. If the concentration 174 of the refrigerant exceeds the gas concentration threshold 172, the first part further includes activating the alarm 198, and proceeding to the second part of operational flow 1100.

The second part includes operations 1108-1112, which generally includes operating the HVAC system 100, 200 in a mitigation mode 195 (e.g., compressor 106a-d off, blower 128 on, and fans 110 on) to mitigate the refrigerant leak within the HVAC system 100, 200 and determining if the concentration 174 of the refrigerant still exceeds gas concentration threshold 172 after operating the HVAC system 100, 200 in the mitigation mode 195. If the concentration 174 of the refrigerant is below the gas concentration threshold 172 after operating the HVAC system 100, 200 in the mitigation mode 195, the second part may proceed to deactivate the alarm 198 and proceed to the third part of operational flow 500.

The third part includes operations 1114-1126, and may start by operating the HVAC system 100, 200 in a leak diagnostic mode 186 to determine if one or more refrigerant circuits 201-204 include a refrigerant leak. The third part may include keeping the compressor 106a-106d off in the leak diagnostic mode 186, and waiting for a predetermined duration 170 before acquiring at least a first suction pressure 166g (i) for one or more refrigerant circuit 201-204 using one or more loss of charge sensor 140a-140d. The third part may further include waiting for another predetermined duration 170 before acquiring a second suction pressure 166g (ii) for the one or more refrigerant circuit 201-204 using the loss of charge sensor 140a-140d. The third part of operational flow 1100 may further include determining a difference between the first suction pressure 166g (i) and the second suction pressure before proceeding to the fourth part of operational flow 500.

The fourth part includes operations 1126-1144, which generally includes determining whether a refrigerant leak is present in one or refrigerant circuit 201-204. The fourth part may include determining that a refrigerant leak is present in the one or more refrigerant circuits 201-204 if the difference between the first suction pressure 166g (i) and the second suction pressure 166g (ii) measured for the one or more refrigerant circuit 201-204 exceeds a suction pressure threshold value 168a. If the suction pressure threshold value 168a is exceeded, the fourth part of operational flow 1100 may further include evacuating each refrigerant circuit 201-204 exceeding the threshold using in a pump down mode 176.

At operation 1102, the operational flow 1100 includes acquiring a measurement indicative of a concentration 174 of the refrigerant using the one or more leak detection sensors 150-154. For example, a first leak detection sensor 150 may be positioned adjacent to the evaporator 116 or within the duct system 122. The first leak detection sensor 150 may be configured to acquire a measurement indicative of a concentration 174 of the refrigerant in the indoor unit of the HVAC system 100, 200. In some embodiments, a second leak detection sensor 152 may be positioned proximate to the condenser 108. The second leak detection sensor 152 may be configured to acquire a measurement indicative of a concentration 174 of the refrigerant in the outdoor unit of the HVAC system 100, 200. In some embodiments, a third leak detection sensor 154 may be positioned proximate to the compressor 106 or controller 104. The third leak detection sensor 154 may be configured to acquire a measurement indicative of a concentration 174 of the refrigerant in the control panel unit of the HVAC system 100, 200.

At decision block 1104, the operational flow 1100 includes determining whether the concentration 174 of the refrigerant exceeds a gas concentration threshold 172. In some embodiments, the controller 104 may receive a measurement from the one or more leak detection sensors 150-154 that is indicative of the concentration 174 of the refrigerant. As described in detail above, the one or more leak detection sensor 150-154 may be a thermal conductivity sensor or a speed of sound sensor. The controller 104 may receive the change in thermal conductivity and/or speed of sound of the air surrounding the one or more leak detection sensor 150-154 to determine a first concentration 174a of refrigerant. Decision block 1104 may further include using the controller 104 to compare the first concentration 174a of the refrigerant to a gas concentration threshold 172. In some embodiments, the gas concentration threshold 172 is 12% of a lower flammability limit (LFL) of the refrigerant. If the concentration 174 of the refrigerant exceeds the gas concentration threshold 172, then the operational flow 500 may proceed to operation 506. At operation 1106, the operational flow 1100 includes activating an alarm 198. For example, the controller 104 may be configured to cause the alarm 198 to produce an audio or visual indication to alert the user that the gas concentration threshold 172 is exceeded.

At operation 1108, the operational flow 1100 includes operating the HVAC system 100, 200 in a mitigation mode 195. During the mitigation mode 195, the HVAC system 100, 200 may activate the blower 128 and/or the fan 110 in attempts to use airflow to mitigate the leaked refrigerant from accumulating within the HVAC system 100, 200. For example, in response to determining that the concentration 174 of the refrigerant exceeds the gas concentration threshold 172, the HVAC system 100, 200 may operate in the mitigation mode 195, which includes turning the compressor 106a-106d off, turning the blower 128 on, and optionally turning fan 110 on to mitigate the accumulation of the leaked refrigerant within the HVAC system 100, 200.

At decision block 1110, the operational flow 1100 includes determining whether the concentration 174 of the refrigerant continues to exceed the gas concentration threshold 172 after operating in the mitigation mode 195 for a duration. For example, decision block 510 may include using the one or more leak detection sensors 150-154 to acquire a second measurement indicative of the concentration 174 of the refrigerant and comparing the second measurement to the gas concentration threshold 172. If the concentration 174 of the refrigerant continues to exceed the gas concentration threshold 172, the decision block 1110 may include returning to operation 508 to continue operating the HVAC system 100, 200 in the mitigation mode 195. If the second measurement is below the gas concentration threshold 172, the operational flow may proceed to operation 1112, which includes deactivating the alarm 198.

At operation 1114, the operational flow 1100 includes operating the HVAC system 100, 200 in a leak diagnostic mode 186. In some embodiments, the leak diagnostic mode 186 is implemented to identify which of the one or more refrigerant circuit 201-204 includes the refrigerant leak. During the leak diagnostic mode 186 for operational flow 1100, the controller 104 may keep the compressor 106a-106d for the one or more refrigerant circuits 201-204 turned off (e.g., in an idle mode). During the leak diagnostic mode 186, the blower 128 and the fan 110 are turned on. Operation 1116 includes operating the HVAC system 100, 200 in the leak diagnostic mode 186 with the compressor 106a-106d off for a predetermined duration 170. The predetermined duration 170 may include any amount of time, but in some embodiments ranges from about 5 minutes to 10 minutes.

At operation 1118, the operational flow 1100 includes acquiring a first measurement indicative of a first suction pressure 166g (i) for the one or more refrigerant circuits 201-204 using one or more loss of charge sensor 140a-140d. The operational flow 1100 includes performing operation 1118 while the compressor 106a-106d for the one or more refrigerant circuit 201-204 is turned off. At operation 1120, the operational flow 500 includes waiting a predetermined duration 170 while the compressor 106a-106d for the one or more refrigerant circuit 201-204 is turned off. The predetermined duration 170 may be any amount of time, but in some embodiments ranges from about 5 minutes to 10 minutes. At operation 1122, the operational flow 1100 includes acquiring at least a second suction pressure 166g (ii) for the one or more refrigerant circuits 201-204 using one or more loss of charge sensor 140a-140d while the compressor 106a-106d for the one or more refrigerant circuits 201-204 is turned off.

At operation 1124, the operational flow 1100 includes determining a difference between the first suction pressure 166g (i) measured in operation 1118 and the second suction pressure 166g (ii) measured in operation 1124 for the one or more refrigerant circuits 201-204. As discussed above, if a refrigerant circuit 201-204 is experiencing a refrigerant leak, the suction pressure 166g may deviate over time during an idle mode of operation. The deviation of the suction pressure 166g may be tracked and used to identify which of the refrigerant circuits 201-204 includes the refrigerant leak.

For example, at decision block 1126 the operational flow 1100 includes determining if the first refrigerant circuit 201 includes a refrigerant leak by comparing the difference between the first suction pressure 166g (i) and the second suction pressure 166g (ii) for the first refrigerant circuit 201 to a suction pressure threshold value 168a. In some embodiments, the suction pressure threshold value 168a is set to about 4 psig. If the difference between the first suction pressure 166g (i) and the second suction pressure 166g (ii) for the first refrigerant circuit 201 exceeds the suction pressure threshold value 168a then the controller 104 may determine that the first refrigerant circuit 201 includes a refrigerant leak and may proceed to operation 1128.

At operation 1128, the HVAC system 100, 200 may be operated in a pump down mode 176, where during the pump down mode 176 the controller 104 is configured to turn on the first compressor 106a and close the first controllable valve 156a in the first refrigerant circuit 201 to contain the refrigerant between the first compressor 106a and the first controllable valve 156a. In some embodiments, closing the first controllable valve 156a causes the refrigerant to vent from the first pressure relief valve 158a as the predetermined pressure threshold 180 of the first pressure relief valve 158a is exceeded. In this way, the refrigerant may be evacuated from the first refrigerant circuit 201 in the event that a refrigerant leak is detected.

Returning to decision block 1126, if the difference between the first suction pressure 166g (i) and the second suction pressure 166g (ii) for the first refrigerant circuit 201 is below the suction pressure threshold value 168a, the operational flow 1100 may proceed to decision block 1130. The operational flow 1100 may also proceed to decision block 1130 after operation 1128.

At decision block 1130, the operational flow 1100 includes determining if the second refrigerant circuit 202 includes a refrigerant leak by comparing the difference between the first suction pressure 166g (i) and the second suction pressure 166g (ii) for the second refrigerant circuit 202 to the suction pressure threshold value 168a. If the difference between the first suction pressure 166g (i) and the second suction pressure 166g (ii) for the second refrigerant circuit 202 exceeds the suction pressure threshold value 168a then the controller 104 may determine that the second refrigerant circuit 202 includes a refrigerant leak and may proceed to operation 1132.

At operation 1132, the HVAC system 100, 200 may be operated in a pump down mode 176, where during the pump down mode 176 the controller 104 is configured to turn on the second compressor 106b and close the second controllable valve 156b in the second refrigerant circuit 202 to contain the refrigerant between the second compressor 106b and the second controllable valve 156b. In some embodiments, closing the second controllable valve 156b causes the refrigerant to vent from the second pressure relief valve 158b as the predetermined pressure threshold 180 of the second pressure relief valve 158b is exceeded.

Returning to decision block 1130, if the difference between the first suction pressure 166g (i) and the second suction pressure 166g (ii) for second refrigerant circuit 202 is below the suction pressure threshold value 168a, the operational flow 1100 may proceed to decision block 1134. The operational flow 1100 may also proceed to decision block 1134 after operation 1132.

At decision block 1134, the operational flow 1100 includes determining if the third refrigerant circuit 203 includes a refrigerant leak by comparing the difference between the first suction pressure 166g (i) and the second suction pressure 166g (ii) for the third refrigerant circuit 203 to the suction pressure threshold value 168a. If the difference between the first suction pressure 166g (i) and the second suction pressure 166g (ii) for the third refrigerant circuit 203 exceeds the suction pressure threshold value 168a then the controller 104 may determine that the third refrigerant circuit 203 includes a refrigerant leak and may proceed to operation 1136.

At operation 1136, the HVAC system 100, 200 may be operated in a pump down mode 176, where during the pump down mode 176 the controller 104 is configured to turn on the third compressor 106c and close the third controllable valve 156c in the third refrigerant circuit 203 to contain the refrigerant between the third compressor 106c and the third controllable valve 156c. In some embodiments, closing the third controllable valve 156c causes the refrigerant to vent from the third pressure relief valve 158c as the predetermined pressure threshold 180 of the third pressure relief valve 158c is exceeded.

Returning to decision block 1134, if the difference between the first suction pressure 166g (i) and the second suction pressure 166g (ii) for third refrigerant circuit 203 is below the suction pressure threshold value 168a, the operational flow 1100 may proceed to decision block 1138. The operational flow 1100 may also proceed to decision block 1138 after operation 1136.

At decision block 1138, the operational flow 1100 includes determining if the fourth refrigerant circuit 204 includes a refrigerant leak by comparing the difference between the first suction pressure 166g (i) and the second suction pressure 166g (ii) for the fourth refrigerant circuit 204 to the suction pressure threshold value 168a. If the difference between the first suction pressure 166g (i) and the second suction pressure 166g (ii) for the fourth refrigerant circuit 204 exceeds the suction pressure threshold value 168a then the controller 104 may determine that the fourth refrigerant circuit 204 includes a refrigerant leak and may proceed to operation 1140.

At operation 1140, the HVAC system 100, 200 may be operated in a pump down mode 176, where during the pump down mode 176 the controller 104 is configured to turn on the fourth compressor 106d and close the fourth controllable valve 156d in the fourth refrigerant circuit 204 to contain the refrigerant between the fourth compressor 106d and the fourth controllable valve 156d. In some embodiments, closing the fourth controllable valve 156d causes the refrigerant to vent from the fourth pressure relief valve 158d as the predetermined pressure threshold 180 of the fourth pressure relief valve 158d is exceeded.

Returning to decision block 1138, if the difference between the first suction pressure 166g (i) and the second suction pressure 166g (ii) for fourth refrigerant circuit 204 is below the suction pressure threshold value 168a, the operational flow 1100 may proceed to decision block 1142. The operational flow 1100 may also proceed to decision block 1142 after operation 1140.

At decision block 1442, the operational flow 1100 includes determining whether the controller 104 should end the leak diagnostic mode 186 and return one or more of the refrigerant circuits 201-204 to a normal mode 178 of operation (e.g., cooling mode of operation or a heating mode of operation with the compressor 106a-106d on) in operation 1144. If a refrigerant leak is detected in operations 1126-1140, the controller 104 in decision block 1142 may transition each of the one or more refrigerant circuit 201-204 that does not include a refrigerant leak to a normal mode 178 of operation in operation 1144. For example, if a refrigerant leak is detected in operations 1126-1140, the controller 104 may end the leak diagnostic mode 186 and initiate the one or more refrigerant circuit 201-204 that does not include a refrigerant leak to operate in the normal mode 178 of operation. If no refrigerant leak is identified in operations 1126-1140, decision block 1142 may include returning the operational flow 1100 to operation 1116 for another cycle in the leak diagnostic mode 186.

Figure 12:
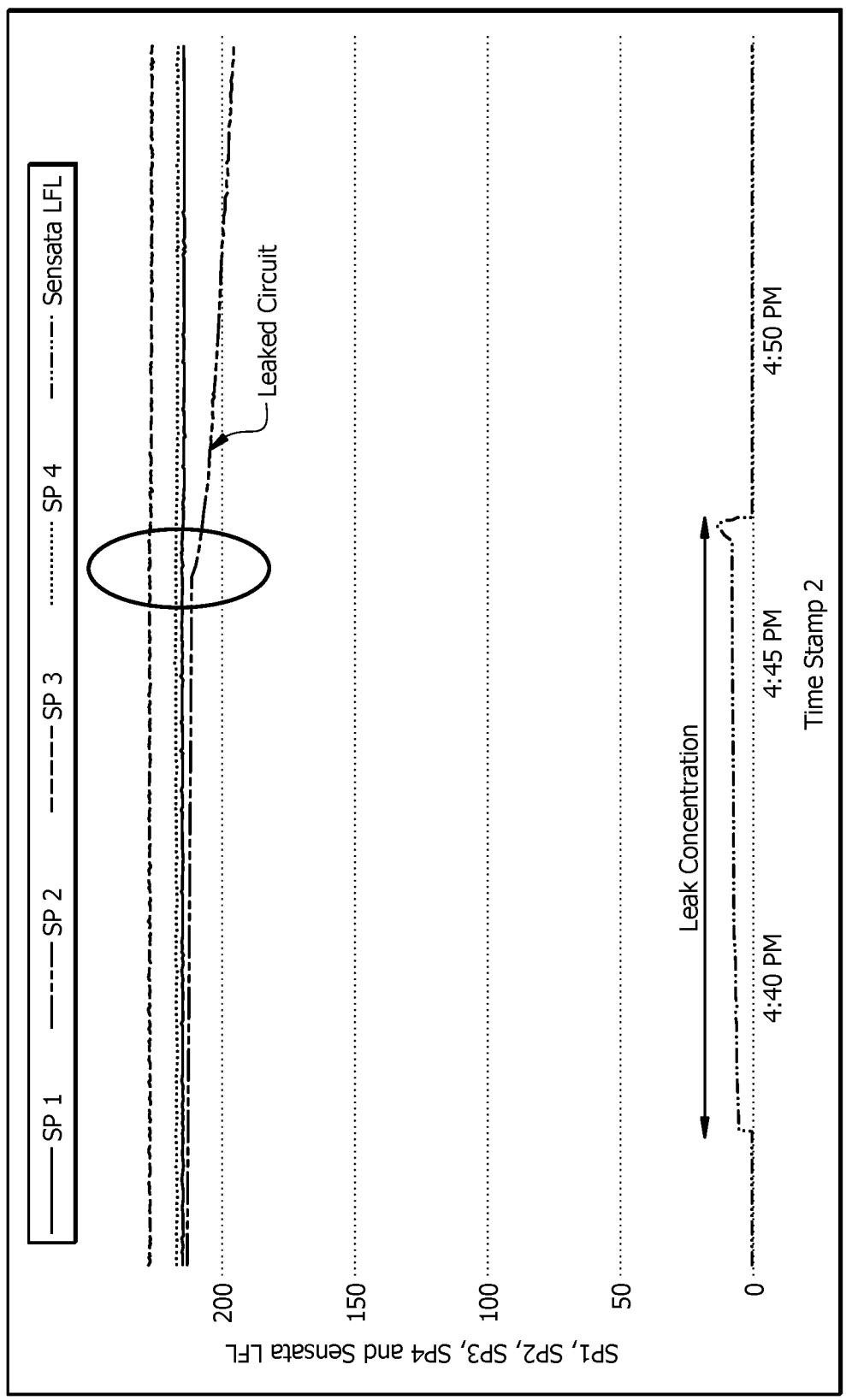
FIG. 12 is a graph illustrating an example of suction pressures (psig) acquired over time by one or more loss of charge sensors during a leak diagnostic mode according to some embodiments of the present disclosure.

FIG. 12 is a non-limiting example illustrating a graph of suction pressures 166g acquired over time by one or more loss of charge sensor 140a-140d in refrigerant circuits 201-204. In this non-limiting example, the second refrigerant circuit 202 includes a suction pressure 166g that deviates over time and exceeds the suction pressure threshold value 168a indicating that the refrigerant leak is in the second refrigerant circuit 202.

Method of Operation

Figure 13:
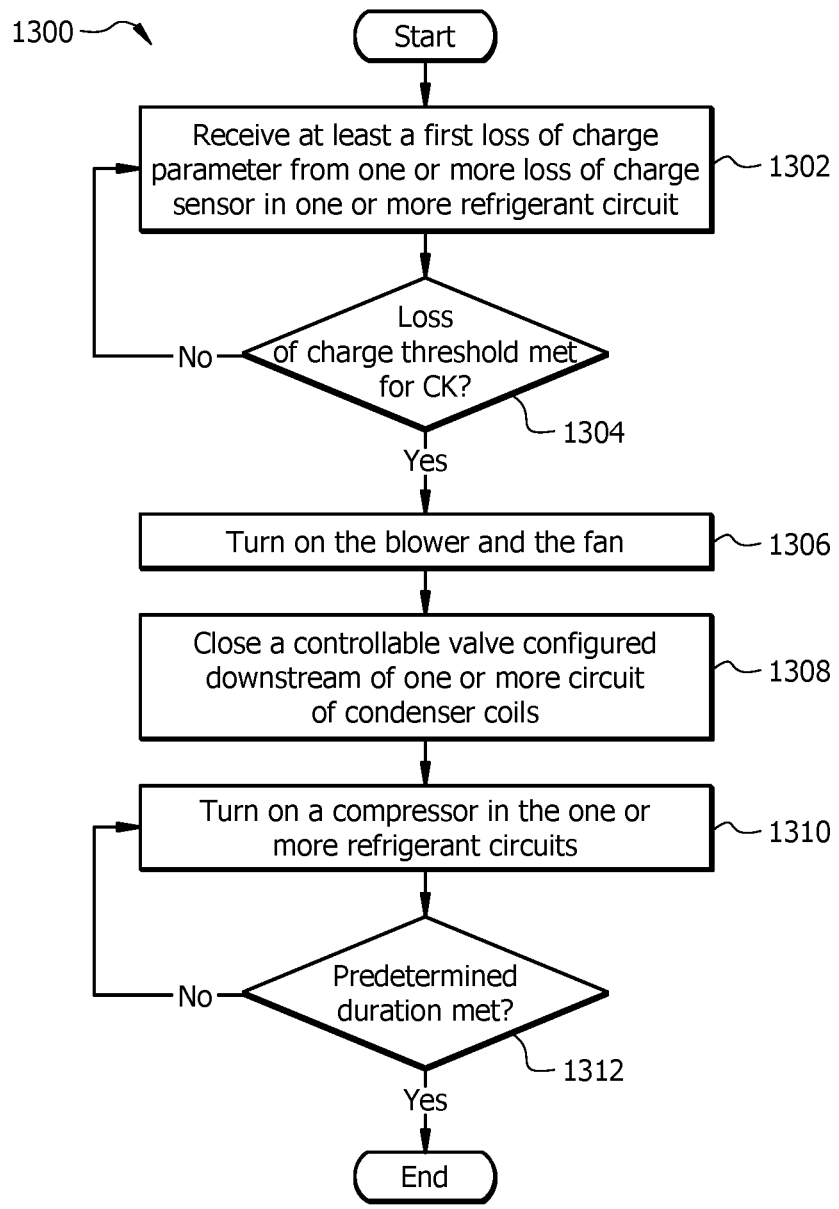
FIG. 13 is a flowchart of an example method of operating the HVAC systems of FIGS. 1-4 according to some embodiments of the present disclosure.

FIG. 13 illustrates an example operational flow 1300 for operating the HVAC system 100, 200 of FIGS. 1-4. In general, the operational flow 1300 may be used to evacuate, or otherwise contain, the refrigerant from one or more refrigerant circuit 201-204 identified as including a refrigerant leak. The operational flow 1300 can logically be described in two parts. The first part includes operations 1302-1304, which generally includes receiving at least a first loss of charge parameter 166 from one or more loss of charge sensor 140-148 in one or more refrigerant circuit 201-204 and determining if a refrigerant leak is present in the one or more refrigerant circuit 201-204 based at least upon a comparison of the one or more loss of charge parameter 166 to a loss of charge threshold 168. If the controller 104 determines that one or more refrigerant circuit 201-204 includes the refrigerant leak, the operational flow 1300 may proceed to the second part.

The second part includes operations 1306-1312, which generally includes turning on the blower 128 and the fan 110, closing a controllable valve 156a-156d configured downstream of one or more circuit of condenser coils 192a-192d in response to determining that the one or more refrigerant circuit 201-204 includes the refrigerant leak, and turning on a compressor 106a-106d to contain the refrigerant between the one or more compressor 106a-106d and the controllable valve 156a-156d. In some embodiments, closing the controllable valve 156a-156d causes the refrigerant to vent from the pressure relief valve 158a-158d if the predetermined pressure threshold 180 of the pressure relief valve 158a-158d is exceeded. In this way, operational flow 1300 may either contain the refrigerant between the compressor 106a-106d and the controllable valve 156a-156d (e.g., if the predetermined pressure threshold 180 is not exceeded during operational flow 1300), or evacuate the refrigerant circuit 201-204 (e.g., if the predetermined pressure threshold 180 is exceeded).

At operation 1302, the operational flow 1300 includes receiving one or more loss of charge parameter 166 from one or more loss of charge sensor 140 (a-d)-148 (a-d) in one or more refrigerant circuit 201-204. In one example, as described in operational flow 500, the one or more loss of charge parameter 166 may include a first saturated suction temperature 166b (i) measured in operation 518 and a second saturated suction temperature 166b (ii) measured in operation 524. In another example, as described in operational flow 700, the one or more loss of charge parameter 166 may include one or more super heat value 166e that is determined based on a difference between a first suction temperature 166c (i) and a first saturated suction temperature 166b (i). In yet another example, as described in operational flow 900, the one or more loss of charge parameter 166 may include one or more subcooled value 166f that is determined based on a difference between a first subcooled liquid temperature 166d (i) and a first saturated liquid temperature 166a (i). In another example, as described in operational flow 1100, the one or more loss of charge parameter 166 may include a first suction pressure 166g (i) measured in operation 1118 and a second suction pressure 166g (ii) measured in operation 1122.

At decision block 1304, the operational flow 1300 includes determining that the one or more refrigerant circuit 201-204 includes a refrigerant leak based at least upon a comparison of a loss of charge threshold 168 to the one or more loss of charge parameter 166. In one example, as described in operational flow 500, decision block 1304 may determine that the one or more refrigerant circuit 201-204 includes a refrigerant leak if a difference between the first saturated suction temperature 166b (i) measured in operation 518 and the second saturated suction temperature 166b (ii) measured in operation 524 exceeds a saturated suction temperature threshold value 168d. In another example, as described in operational flow 700, decision block 1304 may determine that the one or more refrigerant circuit 201-204 includes a refrigerant leak if one or more super heat value 166e exceeds a super heat threshold value 168b. In yet another example, as described in operational flow 900, decision block 1304 may determine that the one or more refrigerant circuit 201-204 includes a refrigerant leak if one or more subcooled value 166f is below a subcooled threshold value 168c. In another example, as described in operational flow 1100, decision block 1304 may determine that the one or more refrigerant circuit includes a refrigerant leak if a difference between the first suction pressure 166g (i) measured in operation 1118 and the second suction pressure 166g (ii) measured in operation 1122 exceeds a suction pressure threshold value 168a.

At operation 1306, the operational flow 1300 may include turning on the blower 128 and the fan 110. At operation 1308, the operational flow 1300 may include operating the HVAC system 100, 200 in a pump down mode 176 in response to determining that the one or more refrigerant circuit 201-204 includes the refrigerant leak. In some embodiments, during the pump down mode 176, the controller 104 may be configured to close a controllable valve 156a-158d in the one or more refrigerant circuit 201-204 including the refrigerant leak. At operation 1310, the operational flow 1300 may include turning on a compressor 106a-106d in the one or more refrigerant circuits 201-204 including the refrigerant leak to contain the refrigerant between the compressor 106a-106d and the controllable valve 156a-156d. In some embodiments, closing the controllable valve 156a-156d causes the refrigerant to vent from a pressure relief valve 158a-158d if a predetermined pressure threshold 180 of the pressure relief valve 158a-158d is exceeded. In this way, the refrigerant may be evacuated from the one or more refrigerant circuit 201-204 in the event that a refrigerant leak is detected.

At decision block 1312, the operational flow 1300 may include compressing the refrigerant using the compressor 106a-106d for a predetermined duration 170. The predetermined duration 170 may be any amount of time, but in some embodiments ranges from about 5 to 20 minutes. If the predetermined duration 170 is not met, the operational flow 1300 returns to operation 1308 to continue to compress the refrigerant. If the predetermined duration 170 is met, the operational flow 1300 may end.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A heating, ventilation, and air conditioning (HVAC) system, the HVAC system comprising:
 a condenser;
 an evaporator;
 a leak detection sensor;
 a first refrigerant circuit comprising:
  a first compressor configured to receive a refrigerant;
  a first loss of charge sensor configured to acquire a measurement indicative of a saturated liquid temperature of the refrigerant in the first refrigerant circuit;
  a second loss of charge sensor configured to acquire a measurement indicative of a subcooled liquid temperature of the refrigerant in the first refrigerant circuit;
 a controller comprising a memory and a processor, the memory operable to store a subcooled threshold value, a gas concentration threshold, a first predetermined duration, the processor operatively coupled to the memory and configured to:
  receive, from the leak detection sensor, a measurement indicative of a concentration of the refrigerant;
  compare the concentration of the refrigerant to the gas concentration threshold;
  determine that the HVAC system should operate in a leak diagnostic mode if the concentration of the refrigerant exceeds the gas concentration threshold, wherein during the leak diagnostic mode the controller is configured to:
   turn on the first compressor to compress the refrigerant;
   receive, from the first loss of charge sensor, a first measurement indicative of a first saturated liquid temperature of the refrigerant;
   receive, from the second loss of charge sensor, a second measurement indicative of a first subcooled liquid temperature of the refrigerant;
   determine a first subcooled value based at least in part upon a difference between the first subcooled liquid temperature and the first saturated liquid temperature;
   turn off the first compressor for the first predetermined duration;
   turn on the first compressor to compress the refrigerant after the first predetermined duration has elapsed;
   receive, from the first loss of charge sensor, a third measurement indicative of a second saturated liquid temperature of the refrigerant;
   receive, from the second loss of charge sensor, a fourth measurement indicative of a second subcooled liquid temperature of the refrigerant;
   determine a second subcooled value based at least in part upon a difference between the second subcooled liquid temperature and the second saturated liquid temperature;
   determine that the first refrigerant circuit includes a refrigerant leak if at least one of the second subcooled value and the first subcooled value are below the subcooled threshold value.

2. The HVAC system of claim 1, wherein the controller is configured to:
 cycle the first compressor on and off for a plurality of cycles;
 receive, from the first loss of charge sensor, a measurement indicative of the saturated liquid temperature of the refrigerant for each of the plurality of cycles while the first compressor is turned on;
 receive, from the second loss of charge sensor, a measurement indicative of the subcooled liquid temperature of the refrigerant for each of the plurality of cycles while the compressor is turned on;
 determine a subcooled value for each of the plurality of cycles based at least in part upon the difference between the subcooled liquid temperature and the saturated liquid temperature of the refrigerant for each of the plurality of cycles;
 determine that the first refrigerant circuit includes the refrigerant leak if the subcooled threshold value for two or more cycles in the plurality of cycles are below the subcooled threshold value.

3. The HVAC system of claim 1, further comprising:
 a first circuit of condenser coils in the condenser, the first circuit of condenser coils configured to receive the refrigerant from the first compressor;
 a first expansion valve configured downstream of the first circuit of condenser coils, the first expansion valve configured to receive the refrigerant from the first circuit of condenser coils;
 a first circuit of evaporator coils, the first circuit of evaporator coils configured to receive the refrigerant from the first expansion valve, and wherein the first compressor is configured to receive the refrigerant from the first circuit of evaporator coils
 wherein the first loss of charge sensor is a pressure sensor positioned between an inlet or outlet of the first circuit of condenser coils and an inlet of the first expansion valve; and
 wherein the second loss of charge sensor is a temperature sensor positioned between the outlet of the first circuit of condenser coils and the inlet of the first expansion valve.

4. The HVAC system of claim 1 further comprising:
 a first controllable valve configured downstream of the condenser, the first controllable valve configured to receive the refrigerant from the condenser, and
 a first pressure relief valve positioned upstream of the first controllable valve and downstream of the first compressor, the first pressure relief valve configured to vent the refrigerant from the first refrigerant circuit if a predetermined pressure threshold is exceeded.

5. The HVAC system of claim 4, wherein in response to determining that the first refrigerant circuit comprises the refrigerant leak, the controller is further configured to:
 determine that the HVAC system should operate in a pump down mode, wherein during the pump down mode the controller is configured to close the first controllable valve, and wherein closing the first controllable valve which causes the refrigerant to vent from the first pressure relief valve as the predetermined pressure threshold is exceeded.

6. The HVAC system of claim 1, further comprising a second refrigerant circuit, the second refrigerant circuit comprising:
a second compressor configured to receive the refrigerant;
a third loss of charge sensor configured to acquire a measurement indicative of the saturated liquid temperature of the refrigerant in the second refrigerant circuit;
a fourth loss of charge sensor configured to acquire a measurement indicative of the subcooled liquid temperature of the refrigerant in the second refrigerant circuit;
wherein during the leak diagnostic mode, the controller is configured to:
turn on the second compressor to compress the refrigerant;
receive, from the third loss of charge sensor, a fifth measurement indicative of a third saturated liquid temperature of the refrigerant;
receive, from the fourth loss of charge sensor, a sixth measurement indicative of a third subcooled liquid temperature of the refrigerant;
determine a third subcooled value based at least in part upon a difference between the third saturated liquid temperature and the third subcooled liquid temperature;
determine that the third subcooled value is above the subcooled threshold value;
turn off the second compressor for the first predetermined duration;
turn on the second compressor to compress the refrigerant after the first predetermined duration has elapsed;
receive, from the third loss of charge sensor, a seventh measurement indicative of a fourth saturated liquid temperature of the refrigerant;
receive, from the fourth loss of charge sensor, an eighth measurement indicative of a fourth subcooled liquid temperature of the refrigerant;
determine a fourth subcooled value based at least in part upon a difference between the fourth saturated liquid temperature and the fourth subcooled liquid temperature;
determine that the fourth subcooled value is above the subcooled threshold value; and
in response to determining that the third subcooled value and the fourth subcooled value are above the subcooled threshold value, the controller is configured to end the leak diagnostic mode for the second refrigerant circuit and initiate a normal mode of operation for the second refrigerant circuit, wherein in the normal mode of operation, the controller is configured to turn on the second compressor.

7. The HVAC system of claim 1 further comprising:
a blower configured to move airflow across the evaporator;
wherein in response to determining that the concentration of the refrigerant exceeds the gas concentration threshold, the controller is configured to operate the HVAC system in a mitigation mode prior to operating in the leak diagnostic mode, wherein during the mitigation mode the controller is further configured to:
turn the first compressor off;
turn the blower on;
receive, from the leak detection sensor, a second measurement indicative of the concentration of the refrigerant; and
determine that the concentration of the refrigerant is below the gas concentration threshold, and in response end the mitigation mode and initiate the leak diagnostic mode.

8. A method of operating a heating, ventilation, and air conditioning (HVAC) system, the method comprising:
receiving, from a leak detection sensor, a measurement indicative of a concentration of a refrigerant;
determining, using a controller, that the HVAC system should operate in a leak diagnostic mode if a concentration of the refrigerant exceeds a gas concentration threshold, and wherein during the leak diagnostic mode the method further comprises:
turning on a first compressor to compress the refrigerant in a first refrigerant circuit;
receiving, from a first loss of charge sensor, a first measurement indicative of a first saturated liquid temperature of the refrigerant;
receiving, from a second loss of charge sensor, a second measurement indicative of a first subcooled liquid temperature of the refrigerant;
determining a first subcooled value based at least in part upon a difference between the first subcooled liquid temperature and the first saturated liquid temperature;
turning off the first compressor for a first predetermined duration;
turning on the first compressor to compress the refrigerant after the first predetermined duration has elapsed;
receiving, from the first loss of charge sensor, a third measurement indicative of a second saturated liquid temperature of the refrigerant;
receiving, from the second loss of charge sensor, a fourth measurement indicative of a second subcooled liquid temperature of the refrigerant;
determining a second subcooled value based at least in part upon a difference between the second subcooled liquid temperature and the second saturated liquid temperature; and
determining that the first refrigerant circuit includes a refrigerant leak if at least one of the second subcooled value and the first subcooled value are below a subcooled threshold value.

9. The method of claim 8, further comprising:
cycling the first compressor on and off for a plurality of cycles;
receiving, from the first loss of charge sensor, a measurement indicative of the saturated liquid temperature of the refrigerant for each of the plurality of cycles while the first compressor is turned on;
receiving, from the second loss of charge sensor, a measurement indicative of the subcooled liquid temperature of the refrigerant for each of the plurality of cycles while the compressor is turned on;
determining a subcooled value for each of the plurality of cycles based at least in part upon the difference between the subcooled liquid temperature and the saturated liquid temperature of the refrigerant for each of the plurality of cycles;
determining that the first refrigerant circuit includes the refrigerant leak if the subcooled threshold value for two or more cycles in the plurality of cycles are below the subcooled threshold value.

10. The method of claim 8, further comprising:
a first circuit of condenser coils in a condenser, the first circuit of condenser coils configured to receive the refrigerant from the first compressor;
a first expansion valve configured downstream of the first circuit of condenser coils, the first expansion valve configured to receive the refrigerant from the first circuit of condenser coils;
a first circuit of evaporator coils, the first circuit of evaporator coils configured to receive the refrigerant from the first expansion valve, and wherein the first compressor is configured to receive the refrigerant from the first circuit of evaporator coils
wherein the first sensor is a pressure sensor positioned between an outlet of the first circuit of condenser coils and an inlet of the first expansion valve; and
wherein the second sensor is a temperature sensor positioned between the outlet of the first circuit of condenser coils and the inlet of the first expansion valve.

11. The method of claim 10, further comprising:
a first controllable valve configured downstream of the condenser, the first controllable valve configured to receive the refrigerant from the condenser, and
a first pressure relief valve positioned upstream of the first controllable valve and downstream of the first compressor, the first pressure relief valve configured to vent the refrigerant from the first refrigerant circuit if a predetermined pressure threshold is exceeded.

12. The method of claim 11, wherein in response to determining that the first refrigerant circuit comprises the refrigerant leak, the controller is further configured to:
determine that the HVAC system should operate in a pump down mode, wherein during the pump down mode the controller is configured to close the first controllable valve, and wherein closing the first controllable valve which causes the refrigerant to vent from the first pressure relief valve as the predetermined pressure threshold is exceeded.

13. The method of claim 8, further comprising a second refrigerant circuit, the second refrigerant circuit comprising:
a second compressor configured to receive the refrigerant;
a third loss of charge sensor configured to acquire a measurement indicative of the saturated liquid temperature of the refrigerant in the second refrigerant circuit;
a fourth loss of charge sensor configured to acquire a measurement indicative of the subcooled liquid temperature of the refrigerant in the second refrigerant circuit;
wherein during the leak diagnostic mode, the method comprises:
turning on the second compressor to compress the refrigerant;
receiving, from the third loss of charge sensor, a fifth measurement indicative of a third saturated liquid temperature of the refrigerant;
receiving, from the fourth loss of charge sensor, a sixth measurement indicative of a third subcooled liquid temperature of the refrigerant;
determining a third subcooled value based at least in part upon a difference between the third saturated liquid temperature and the third subcooled liquid temperature;
determining that the third subcooled value is above the subcooled threshold value;
turning off the second compressor for the first predetermined duration;
turning on the second compressor to compress the refrigerant after the first predetermined duration has elapsed;
receiving, from the third loss of charge sensor, a seventh measurement indicative of a fourth saturated liquid temperature of the refrigerant;
receiving, from the fourth loss of charge sensor, an eighth measurement indicative of a fourth subcooled liquid temperature of the refrigerant;
determining a fourth subcooled value based at least in part upon a difference between the fourth saturated liquid temperature and the fourth subcooled liquid temperature;
determining that the fourth subcooled value is above the subcooled threshold value; and
in response to determining that the third subcooled value and the fourth subcooled value are above the subcooled threshold value, the method further comprises:
ending the leak diagnostic mode for the second refrigerant circuit; and
initiating a normal mode of operation for the second refrigerant circuit, wherein in the normal mode of operation, the controller is configured to turn on the second compressor.

14. The method of claim 8, further comprising:
a blower configured to move airflow across an evaporator;
wherein in response to determining that the concentration of the refrigerant exceeds the gas concentration threshold, the method further comprises:
operating the HVAC system in a mitigation mode prior to operating in the leak diagnostic mode, wherein during the mitigation mode the method further comprises:
turning the first compressor off using the controller;
turn the blower on using the controller;
receiving, from the leak detection sensor, a measurement indicative of the concentration of the refrigerant; and
determining that the concentration of the refrigerant is below the gas concentration threshold, and in response end the mitigation mode and initiate the leak diagnostic mode.

15. A controller of a heating, ventilation, and air conditioning (HVAC) system, the controller comprising:
a memory operable to store a subcooled threshold value, a gas concentration threshold, a first predetermined duration;
a processor operatively coupled to the memory and configured to:
receive, from a leak detection sensor, a measurement indicative of a concentration of a refrigerant;
compare the concentration of the refrigerant to the gas concentration threshold;
determine that the HVAC system should operate in a leak diagnostic mode if the concentration of the refrigerant exceeds the gas concentration threshold, wherein during the leak diagnostic mode the processor is configured to:
turn on a first compressor to compress the refrigerant in a first refrigerant circuit;
receive, from a first loss of charge sensor, a first measurement indicative of a first saturated liquid temperature of the refrigerant;
receive, from a second loss of charge sensor, a second measurement indicative of a first subcooled liquid temperature of the refrigerant;

determine a first subcooled value based at least in part upon a difference between the first subcooled liquid temperature and the first saturated liquid temperature;

turn off the first compressor for the first predetermined duration;

turn on the first compressor to compress the refrigerant after the first predetermined duration has elapsed;

receive, from the first loss of charge sensor, a third measurement indicative of a second saturated liquid temperature of the refrigerant;

receive, from the second loss of charge sensor, a fourth measurement indicative of a second subcooled liquid temperature of the refrigerant;

determine a second subcooled value based at least in part upon a difference between the second subcooled liquid temperature and the second saturated liquid temperature; and determine that the first refrigerant circuit includes a refrigerant leak if at least one of the second subcooled value and the first subcooled value are below the subcooled threshold value.

16. The controller of claim 15, wherein the processor is further configured to:

cycle the first compressor on and off for a plurality of cycles;

receive, from the first loss of charge sensor, a measurement indicative of the saturated liquid temperature of the refrigerant for each of the plurality of cycles while the first compressor is turned on;

receive, from the second loss of charge sensor, a measurement indicative of the subcooled liquid temperature of the refrigerant for each of the plurality of cycles while the compressor is turned on;

determine a subcooled value for each of the plurality of cycles based at least in part upon the difference between the subcooled liquid temperature and the saturated liquid temperature of the refrigerant for each of the plurality of cycles; and determine that the first refrigerant circuit includes the refrigerant leak if the subcooled threshold value for two or more cycles in the plurality of cycles are below the subcooled threshold value.

17. The controller of claim 15, wherein the first sensor is a pressure sensor positioned between an outlet of a first circuit of condenser coils and an inlet of a first expansion valve in the first refrigerant circuit; and wherein the second loss of charge sensor is a temperature sensor positioned between the outlet of the first circuit of condenser coils and the inlet of the first expansion valve.

18. The controller of claim 15, wherein in response to determining that the first refrigerant circuit comprises the refrigerant leak, the processor is further configured to:

determine that the HVAC system should operate in a pump down mode, wherein during the pump down mode the controller is configured to close a first controllable valve configured downstream of a condenser, and wherein closing the first controllable valve causes the refrigerant to vent from a first pressure relief valve configured upstream of the first controllable valve as a predetermined pressure threshold is exceeded.

19. The controller of claim 15, wherein in response to determining that the HVAC system should operate in the leak diagnostic mode, the processor is configured to:

turn on a second compressor to compress the refrigerant in a second refrigerant circuit;

receive, from a third loss of charge sensor, a fifth measurement indicative of a third saturated liquid temperature of the refrigerant;

receive, from a fourth loss of charge sensor, a sixth measurement indicative of a third subcooled liquid temperature of the refrigerant;

determine a third subcooled value based at least in part upon a difference between the third saturated liquid temperature and the third subcooled liquid temperature;

determine that the third subcooled value is above the subcooled threshold value;

turn off the second compressor for the first predetermined duration;

turn on the second compressor to compress the refrigerant after the first predetermined duration has elapsed;

receive, from the third loss of charge sensor, a seventh measurement indicative of a fourth saturated liquid temperature of the refrigerant;

receive, from the fourth loss of charge sensor, an eighth measurement indicative of a fourth subcooled liquid temperature of the refrigerant;

determine a fourth subcooled value based at least in part upon a difference between the fourth saturated liquid temperature and the fourth subcooled liquid temperature;

determine that the fourth subcooled value is above the subcooled threshold value; and in response to determining that the third subcooled value and the fourth subcooled value are above the subcooled threshold value, the controller is configured to end the leak diagnostic mode for the second refrigerant circuit and initiate a normal mode of operation for the second refrigerant circuit, wherein in the normal mode of operation, the controller is configured to turn on the second compressor.

20. The controller of claim 15, wherein in response to determining that the concentration of the refrigerant exceeds the gas concentration threshold, the processor is further configured to operate the HVAC system in a mitigation mode prior to operating in the leak diagnostic mode, wherein during the mitigation mode the processor is further configured to:

turn the first compressor off;

turn a blower on;

receive, from the leak detection sensor, a measurement indicative of the concentration of the refrigerant; and determine that the concentration of the refrigerant is below the gas concentration threshold, and in response end the mitigation mode and initiate the leak diagnostic mode.

* * * * *